(12) United States Patent
Konaka

(10) Patent No.: US 12,313,573 B2
(45) Date of Patent: May 27, 2025

(54) X-RAY DIFFRACTION APPARATUS AND MEASUREMENT METHOD

(71) Applicant: RIGAKU CORPORATION, Tokyo (JP)

(72) Inventor: Hisashi Konaka, Tokyo (JP)

(73) Assignee: RIGAKU CORPORATION, Tokyo (JP)

(*) Notice: Subject to any disclaimer, the term of this patent is extended or adjusted under 35 U.S.C. 154(b) by 179 days.

(21) Appl. No.: 18/107,015

(22) Filed: Feb. 8, 2023

(65) Prior Publication Data

US 2023/0258586 A1 Aug. 17, 2023

(30) Foreign Application Priority Data

Feb. 14, 2022 (JP) .................................. 2022-020882

(51) Int. Cl.
  *G01N 23/207* (2018.01)
  *G01N 23/20016* (2018.01)
  *G01N 23/20025* (2018.01)

(52) U.S. Cl.
  CPC ..... *G01N 23/207* (2013.01); *G01N 23/20016* (2013.01); *G01N 23/20025* (2013.01)

(58) Field of Classification Search
  CPC ........... G01N 23/207; G01N 23/20016; G01N 23/20025; G01N 23/20008
  See application file for complete search history.

(56) References Cited

U.S. PATENT DOCUMENTS

2008/0095311 A1* 4/2008 Zheng .................. G01N 23/207
378/71

FOREIGN PATENT DOCUMENTS

| CN | 209841249 U | * | 12/2019 | |
| JP | H11502312 A | * | 2/1999 | ............... G21K 1/04 |
| JP | 3150167 B2 | * | 3/2001 | |
| JP | 2007-10486 A | | 1/2007 | |
| JP | 2010038722 A | | 2/2010 | |
| JP | 2018063195 A | | 4/2018 | |
| JP | 2020-153724 A | | 9/2020 | |

OTHER PUBLICATIONS

Japanese Office Action issued Feb. 25, 2025 in corresponding Japanese Patent Application No. 2022-020882, 7 pages.

* cited by examiner

*Primary Examiner* — Edwin C Gunberg
*Assistant Examiner* — Richard O Toohey
(74) *Attorney, Agent, or Firm* — XSENSUS LLP

(57) ABSTRACT

According to an aspect of the present invention, an X-ray diffraction apparatus is provided. The X-ray diffraction apparatus comprises: an X-ray source configured to irradiate a sample with an X-ray; a sample stage configured to allow the sample to be disposed in such a manner that the X-ray is diffracted; a detector configured to detect a diffracted X-ray, which is the X-ray that has been diffracted, in one dimension at a detection strip; a slit member provided between the sample stage and the detector, comprising a slit through which the diffracted X-ray can pass; wherein an axis in a longitudinal direction of the slit is parallel to an axis in a longitudinal direction of the detection strip.

12 Claims, 37 Drawing Sheets

X-RAY DIFFRACTION APPARATUS AND MEASUREMENT METHOD

CROSS REFERENCE TO RELATED APPLICATIONS

The present application claims priority under 35 U.S.C. § 119 to Japanese Patent Application No. 2022-020882, filed Feb. 14, 2022. The contents of this application are incorporated herein by reference in their entirety.

BACKGROUND

Technical Field

The present invention relates to an X-ray diffraction apparatus and a measurement method.

Related Art

JP 2007-010486 A discloses an X-ray diffraction apparatus that detects X-ray via a parallel slit analyzer. Further, JP 2020-153724 A discloses an X-ray diffraction apparatus that detects diffracted X-ray using a one-dimensional detector, a two-dimensional detector, or the like.

However, in the X-ray diffraction measurement in which X-ray is detected through a parallel slit analyzer (PSA) as disclosed in JP 2007-010486 A, it is difficult to maintain a high-precision and high-intensity profile, and there is still room for improvement.

In addition, even in the X-ray diffraction measurement without PSA as in JP 2020-153724 A, accuracy and precision could not be maintained, depending on a setting condition of a sample, a shape of the sample, etc., and there is still room for improvement.

The present invention aims to solve such problems, and in view of the above circumstances, the purpose of the present invention is to provide an X-ray diffraction apparatus and a measurement method that can obtain a highly accurate and precise profile with higher intensity without depending on conditions.

According to an aspect of the present invention, an X-ray diffraction apparatus is provided. The X-ray diffraction apparatus comprises: an X-ray source configured to irradiate a sample with an X-ray; a sample stage configured to allow the sample to be disposed in such a manner that the X-ray is diffracted; a detector configured to detect a diffracted X-ray, which is the X-ray that has been diffracted, in one dimension at a detection strip; a slit member provided between the sample stage and the detector, comprising a slit through which the diffracted X-ray can pass, wherein an axis in a longitudinal direction of the slit is parallel to an axis in a longitudinal direction of the detection strip.

DETAILED DESCRIPTION

Hereinafter, an X-ray diffraction apparatus according to the present invention will be described based on embodiments. Various features described in the embodiment below can be combined with each other. Note that the present invention is not limited to the embodiments. In addition, drawings attached to the present specification may show components in proportion different from an actual one to show characteristic part in an easy-to-understand manner. In the present specification, three spatial axes orthogonal to each other are an X-axis, a Y-axis, and a Z-axis, and directions along the X-axis, the Y-axis, and the Z-axis are an X-axis direction, a Y-axis direction, and a Z-axis direction, respectively. The same applies to an A-axis direction, a B-axis direction, and a C-axis direction.

Figure 1:
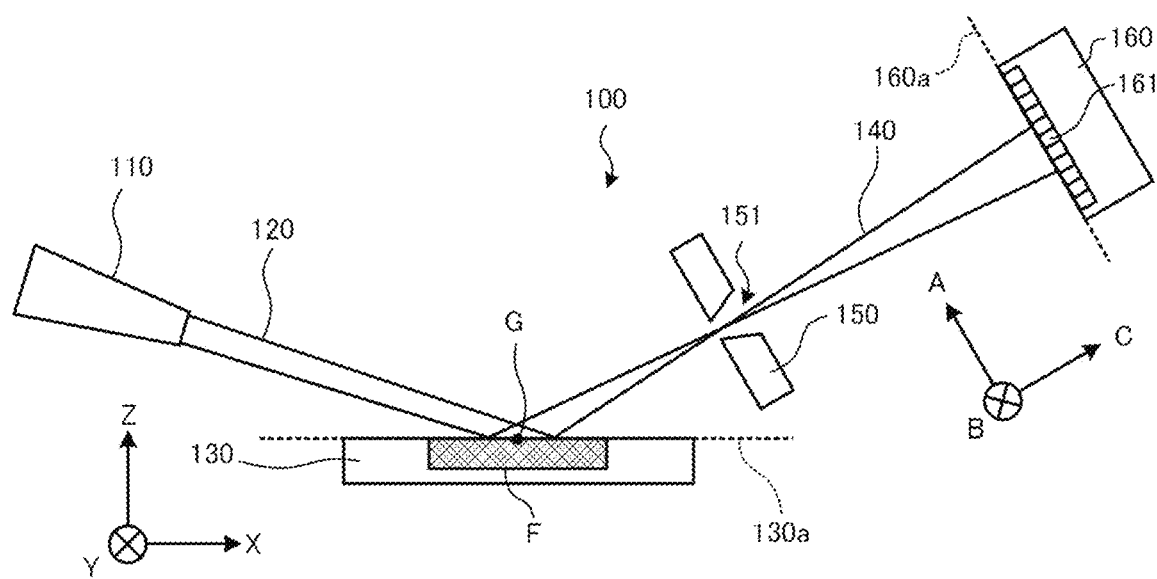
FIG. 1 is a side view showing an example of an X-ray diffraction apparatus 100 according to a first embodiment.
Figure 36:
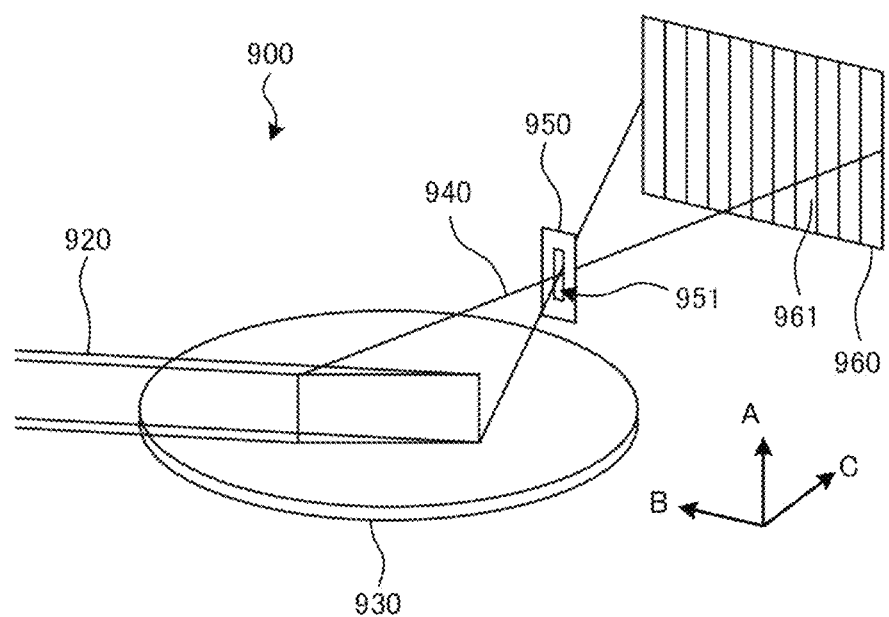
FIG. 36 is a perspective view showing an example of an X-ray diffraction apparatus 900 according to a second embodiment.

A method of X-ray diffraction measurement includes out-of-plane measurement and in-plane measurement, which are defined by a direction of a lattice plane to be measured, respectively. The out-of-plane measurement is a method to evaluate a lattice plane that is not perpendicular to a sample surface, as shown in FIG. 1. On the other hand, the in-plane measurement is a method to evaluate a lattice plane that is perpendicular to a sample surface, as shown in FIG. 36.

FIRST EMBODIMENT

First, a case of performing the out-of-plane measurement will be described.

FIG. 1 is a side view showing an example of an X-ray diffraction apparatus 100 according to a first embodiment.

The X-ray diffraction apparatus 100 comprises an X-ray source 110, a sample stage 130, a slit member 150, and a detector 160. The X-ray source 110 is configured to irradiate a sample F with an incident X-ray 120. The X-ray diffraction apparatus 100 is an apparatus for out-of-plane measurement.

An XYZ coordinate system in FIG. 1 is a Cartesian coordinate system set with reference to an installation surface 130a of the sample F of the sample stage 130. Positive and negative axes are as shown in FIG. 1. A plane defined by an X-axis direction and a Y-axis direction is parallel to the installation surface 130a of the sample stage 130, and a Z-axis direction is perpendicular to the installation surface 130a of the sample stage 130. The same applies to X-axis direction, Y-axis direction, and Z-axis direction in subsequent side views. When a small amount of the sample F is flattened on the installation surface 130a, thickness thereof becomes negligibly small, thus the sample surface may be treated as coincident with the installation surface 130a. In addition, in the first embodiment. XYZ coordinates are based on the installation surface 130a of the sample stage 130 but can also be based on the sample surface.

An ABC coordinate system in FIG. 1 is a Cartesian coordinate system set with reference to a detection surface 160a of the detector 160. Positive and negative axes are as shown in FIG. 1. A plane defined by an A-axis direction and a B-axis direction is parallel to the detection surface 160a of the detector 160, and a C-axis direction is perpendicular to the detection surface 160a of the detector 160. The same applies to A-axis direction, B-axis direction, and C-axis direction in subsequent side views.

In an X-ray diffraction measurement, the detector 160 rotates and moves along a circle called a goniometer circle with a goniometer center G as a reference to detect X-ray diffracted by the sample F.

The X-ray source 110 irradiates the incident X-ray 120 toward the sample F on the sample stage 130. At this time, the X-ray irradiated from the X-ray source 110 to the sample F is parallel X-ray by means of an incident slit (not shown) or other means. The X-ray source 110 may be fixed so as to operate with reference to the goniometer center G. In addition, the X-ray source 110 may be configured to irradiate the incident X-ray 120 such as CuKα, FeKα, etc.

The sample stage 130 is configured to allow the sample F to be disposed in such a manner that the incident X-ray 120 (X-ray) is diffracted. The sample F may be adhered to the sample stage 130. The incident X-ray 120 is irradiated to a surface of the sample F. The incident X-ray 120 emitted from the X-ray source 110 strike the surface of the sample F and diffract at a specific crystal lattice plane within the sample F. A diffracted X-ray 140 diffracted by the crystal lattice plane pass through a slit 151 of the slit member 150 and is detected by a detection strip 161 of the detector 160.

The slit member 150 is provided between the sample stage 130 and the detector 160. Here, the slit member 150 includes the slit 151 through which the diffracted X-ray 140 can pass through. A longitudinal axis (B-axis direction) of the slit 151 of the slit member 150 is parallel to a longitudinal axis (B-axis direction) of the detection strip 161. In other words, the slit 151 is formed along the B-axis direction. Further, a width of the slit 151 in a transverse direction (A-axis direction) is wider than a width of the detection strip 161 in a transverse direction (A-axis direction). In other embodiment, the width of the slit 151 in the transverse direction may be narrower than the width of the detection strip 161 in the transverse direction. Furthermore, the width of slit 151 in the transverse direction may be equal to the width of the detection strip 161 in the transverse direction. In addition, the slit 151 comprises a tapered shape in a direction from the sample stage 130 to the detector 160. That is, the slit 151 comprises a tapered shape that spreads in a+direction of the C-axis. By configuring the slit 151 in a tapered shape, background of a profile can be reduced. In addition, the slit member 150 is supported on the sample stage 130, the detector 160, or an arm of the goniometer. Furthermore, the slit member 150 may be configured of molybdenum or the like as long as it has a property of not transmitting X-ray.

Furthermore, instead of irradiating X-ray to an extremely small region, the slit member 150 including a slit 151 with an appropriately size can be provided. This makes it possible to measure X-ray diffracted from a specific position.

The detector 160 is configured to detect the diffracted X-ray 140, which is the X-ray that has been diffracted, in one dimension at the detection strip 161. That is, the detector 160 is a one-dimensional position sensitive detector in a plane parallel to a diffraction plane. The detection strip 161 configured as an elongated surface extending in the B-axis direction configure one detection channel, and a plurality of the detection channels (e.g., 128) arranged in a horizontal direction (A-axis direction) configure the detection surface 160a. When diffracted X-ray with an arbitrary diffraction angle 2θ is detected on the detection surface 160a, a high intensity profile (peak) can be obtained by integrating a measurement result of the same diffraction angle 2θ measured with different detection strip 161. Here, the narrower the width of the detection strip 161, the higher the accuracy, but the lower the intensity. By increasing the number of the detection strip 161, high intensity data can be obtained while maintaining high accuracy. The detector 160 need only be capable of detecting in one dimension and may comprise a function capable of detecting in zero dimension or two dimensions.

Next, a relationship between the X-ray diffraction apparatus 100 according to the present embodiment and an obtained profile will be described with reference to FIGS. 2 to 4.

Figure 2:
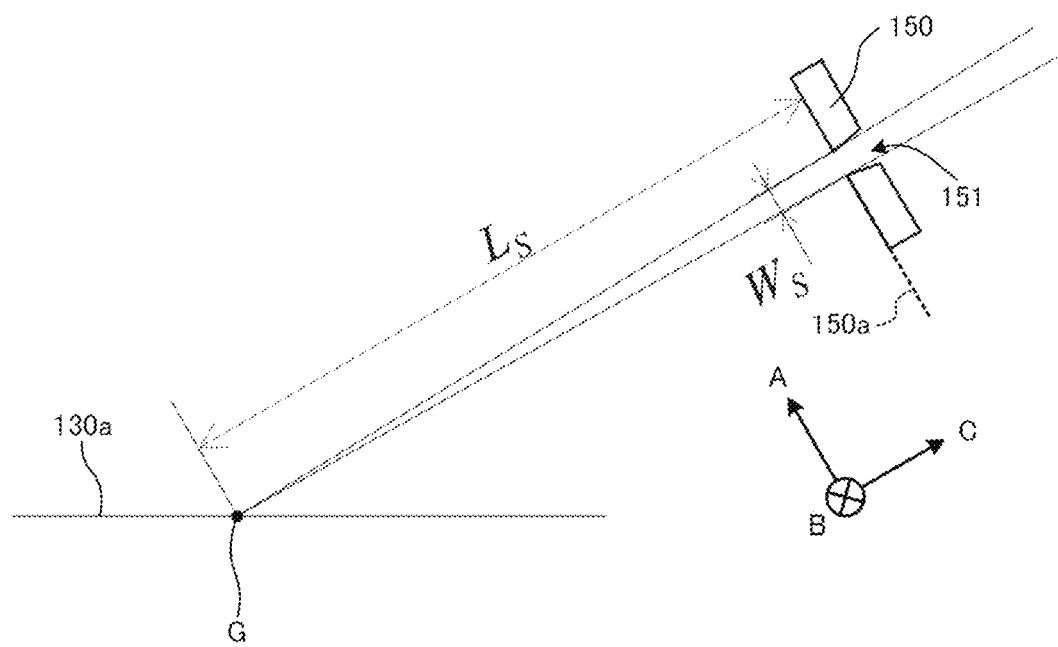
FIG. 2 is a diagram illustrating a relationship between the X-ray diffraction apparatus 100 and intensity of a profile.

FIG. 2 is a diagram illustrating a relationship between the X-ray diffraction apparatus 100 and intensity of a profile.

A shortest distance $L_S$ from the sample F (more specifically, from the goniometer center G) to a front surface 150a of the slit member 150 and a slit width $W_S$ in the transverse direction (A-axis direction) of the slit 151 affect intensity of the measured profile. That is, as shown in Equation 1, the intensity of the measurable profile is proportional to the distance $L_S$ and the slit width $W_S$. Shortening the distance $L_S$ increases the intensity of the profile without reducing accuracy.

Intensity ∝ $\tan^{-1}(W_S/2L_S)$ [Equation 1]

The shortest distance $L_S$ from the goniometer center G to the front surface 150a of the slit member 150 is, for instance, from 5 to 160 mm, preferably from 5 to 50 mm, specifically, for instance, may be 5, 6, 7.8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160 mm, or may be within a range between any two of the numerical values exemplified herein.

The slit width $W_S$ in the transverse direction (A-axis direction) of the slit 151 may be, for example, 0.01, 0.02.0.03.0.04, 0.05, 0.06.0.07, 0.08, 0.09.0.1, 0.11, 0.12.0.13, 0.14, 0.15.0.16.0.17, 0.18, 0.19, 0.2, 0.21, 0.22, 0.23, 0.24, 0.25, 0.26, 0.27, 0.28, 0.29, 0.3, 0.31, 0.32, 0.33, 0.34, 0.35, 0.36, 0.37, 0.38, 0.39, 0.4, 0.41, 0.42, 0.43, 0.44, 0.45, 0.46, 0.47, 0.48, 0.49, 0.5, 0.51, 0.52, 0.53, 0.54, 0.55, 0.56, 0.57, 0.58, 0.59, 0.6, 0.61, 0.62, 0.63, 0.64, 0.65, 0.66, 0.67, 0.68, 0.69, 0.7, 0.71, 0.72, 0.73, 0.74, 0.75, 0.76, 0.77, 0.78, 0.79, 0.8, 0.81, 0.82, 0.83, 0.84, 0.85, 0.86, 0.87, 0.88, 0.89, 0.9, 0.91, 0.92, 0.93, 0.94, 0.95, 0.96, 0.97, 0.98, 0.99, 1, 1.05, 1.1, 1.15, 1.2, 1.25, 1.3, 1.35, 1.4, 1.45, 1.5, 1.55, 1.6, 1.65, 1.7, 1.75, 1.8, 1.85, 1.9, 1.95, 2, 2.05, 2.1, 2.15, 2.2, 2.25, 2.3, 2.35, 2.4, 2.45, 2.5, 2.55, 2.6, 2.65, 2.7, 2.75, 2.8, 2.85, 2.9, 2.95, 3 mm, or may be within a range between any two of the numerical values exemplified herein.

Next, a relationship between the X-ray diffraction apparatus 100 and a peak precision in the profile will be described with reference to FIGS. 3 and 4.

Figure 3:
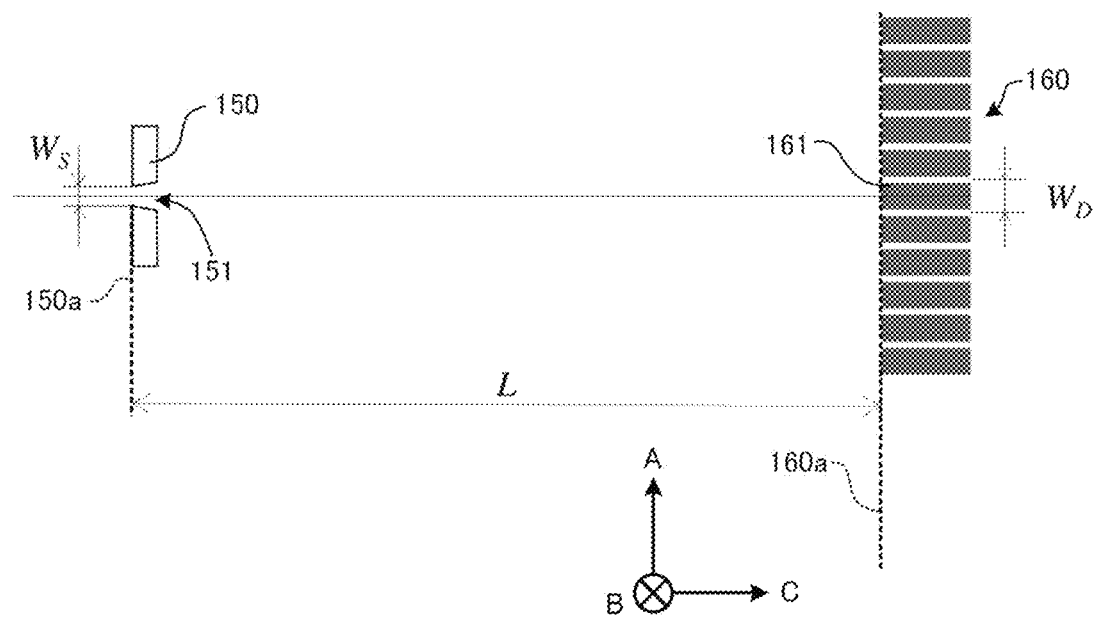
FIG. 3 is a diagram illustrating each parameter of the X-ray diffraction apparatus 100.

FIG. 3 is a diagram illustrating each parameter of the X-ray diffraction apparatus 100.

The peak precision is determined by a shortest distance L from the front surface 150a of the slit member 150 to the detection surface 160a of the detector 160, the slit width $W_S$ in the transverse direction (A-axis direction) of the slit 151, and a strip width $W_D$ in the transverse direction (A-axis direction) of the detection strip 161.

Figure 4:
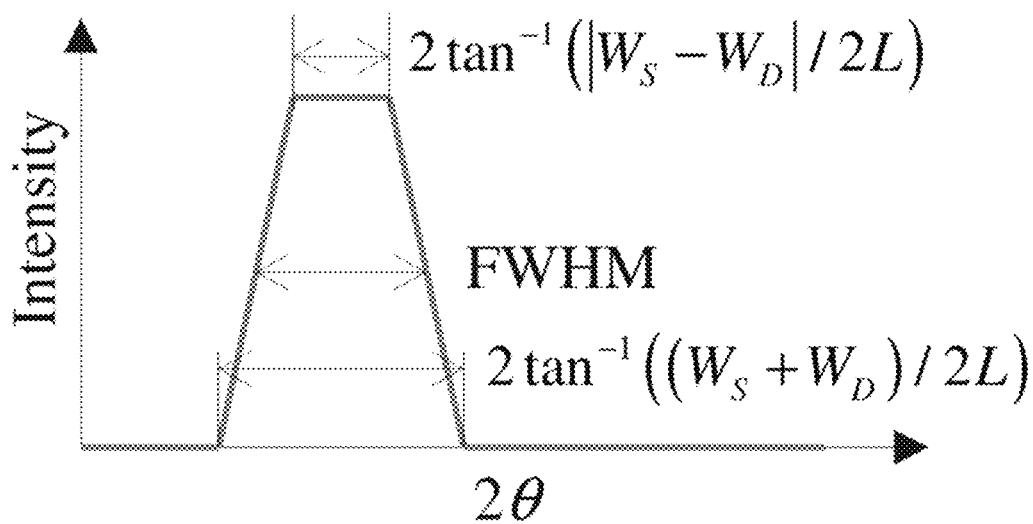
FIG. 4 is a diagram illustrating a relationship between the X-ray diffraction apparatus 100 and a peak precision.

FIG. 4 is a diagram illustrating a relationship between the X-ray diffraction apparatus 100 and the peak precision.

A full width at half maximum (FWHM) of a peak is used as an index of precision. The FWHM can be approximated as shown in Equation 2. That is, by increasing the shortest distance L from the front surface 150a of the slit member 150 to the detection surface 160a of the detector 160 or decreasing the slit width $W_S$ in the transverse direction (A-axis direction) of the slit 151 or the strip width $W_D$ in the transverse direction (A-axis direction) of the detection strip 161, the FWHM can be reduced and the peak precision can be increased.

FWHM ≈ $\tan^{-1}((W_S+W_D)/2L) + \tan^{-1}(|W_S-W_D|/2L)$ [Equation 2]

The strip width $W_D$ in the transverse direction (A-axis direction) of the detection strip 161 is, for example, less than 0.01 mm, preferably from 0.01 to 0.5 mm, and more preferably from 0.05 to 0.2 mm. Specifically, for instance, the strip width $W_D$ may be 0.01, 0.02, 0.03, 0.04, 0.05, 0.06, 0.07, 0.08, 0.09, 0.1, 0.11, 0.12, 0.13, 0.14, 0.15, 0.16, 0.17, 0.18, 0.19, 0.2, 0.21, 0.22, 0.23, 0.24, 0.25, 0.26, 0.27, 0.28, 0.29, 0.3, 0.31, 0.32, 0.33, 0.34, 0.35, 0.36, 0.37, 0.38, 0.39, 0.4, 0.41, 0.42, 0.43, 0.44, 0.45, 0.46, 0.47, 0.48, 0.49, 0.5 mm, or may be within a range between any two of the numerical values exemplified herein.

The shortest distance L from the front surface 150a of the slit member 150 to the detection surface 160a of the detector 160 is, for instance, 50 to 300 mm, more preferably from 100 to 300 mm. Specifically, the shortest distance L may be 50, 60, 70, 80, 90, 100, 110, 120, 130, 140, 150, 160, 170, 180, 190, 200, 210, 220, 230, 240, 250, 260, 270, 280, 290, 300 mm, or may be within a range between any two of the numerical values exemplified herein.

Therefore, based on the Equation 1, the shortest distance $L_S$ from the goniometer center G to the front surface 150a of the slit member 150 and the slit width $W_S$ in the transverse direction (A-axis direction) of the slit 151 is adjusted arbitrarily for the intensity of the profile. Further, based on the Equation 2, the shortest distance L from the front surface 150a of the slit member 150 to the detection surface 160a of the detector 160, the slit width $W_S$ and the strip width $W_D$ in the transverse direction (A-axis direction) of the detection strip 161 are arbitrarily adjusted for peak precision. In other words, the intensity and accuracy can be adjusted arbitrarily by adjusting the distance $L_S$, the distance L, the slit width $W_S$ and the strip width $W_D$ in the present embodiment.

Next, with reference to FIGS. 5 to 8, a relationship between the goniometer angle 2Θ, the detection strip 161, a detection strip 162, and a detection strip 163 at the X-ray detection position D of the detection surface 160a of the detector 160, and the diffraction angle 2θ will be described. The relationship can be applied at least, but not limited to, when the incident X-ray 120 is parallel X-ray. First, a case of X-ray detection position D=0 will be described using FIGS. 5 and 6. Here, a goniometer center line GL is a straight line passing through the goniometer center G and extending in the Y-axis direction. A slit center line SL is a straight line passing through a center in the transverse direction (A-axis direction) of the slit 151 and extending in the B-axis direction. Moreover, a detector center line DL is a straight line passing through the position of the X-ray detection position D=0 of the detector 160 and extending in the B-axis direction. A straight line connecting any points on the goniometer center line GL, the slit center line SL, and the detector center line DL is provided to be aligned.

Figure 5:
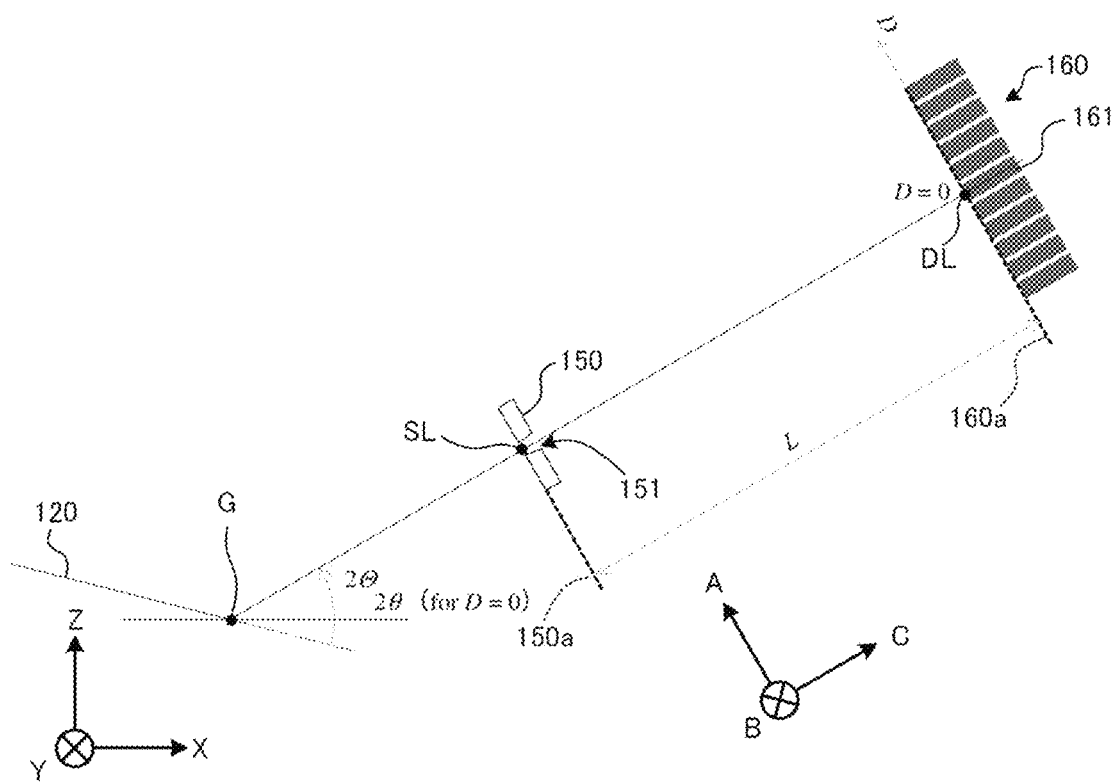
FIG. 5 is a side view illustrating an example of a relationship between a detection surface 160a of a detector 160 and an X-ray detection position D when a goniometer angle 2Θ and a diffraction angle 2θ are matching.

FIG. 5 is a side view illustrating an example of a relationship between the detection surface 160a of the detector 160 and the X-ray detection position D when the goniometer angle 2Θ and the diffraction angle 2θ are matching. Further, FIG. 6 is a perspective view illustrating an example of a relationship between the detector 160 and the X-ray detection position D when the goniometer angle 2Θ and the diffraction angle 2θ are matching.

Figure 6:
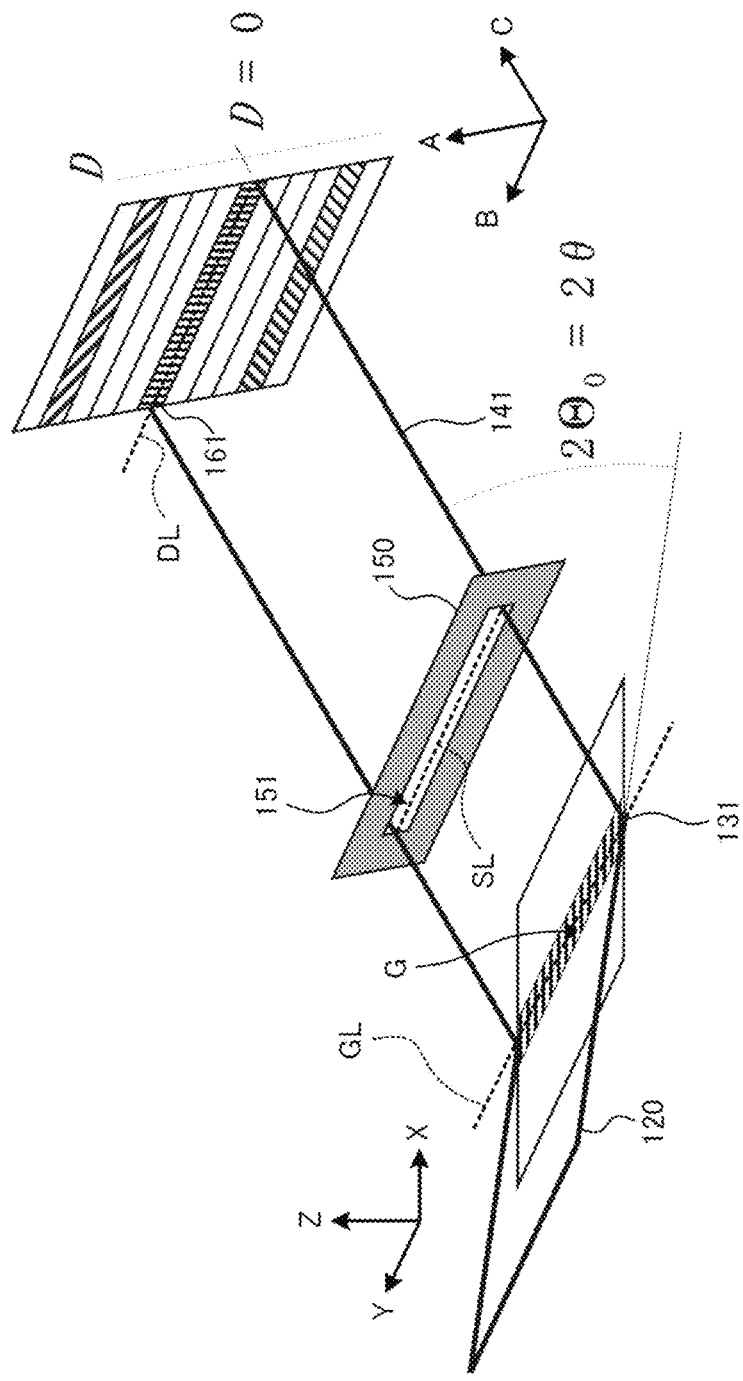
FIG. 6 is a perspective view illustrating an example of a relationship between the detector 160 and the X-ray detection position D when the goniometer angle 2Θ and the diffraction angle 2θ are matching.

As shown in FIGS. 5 and 6, the goniometer center G, the slit center line SL passing through the center in the transverse direction (A-axis direction) of the slit 151, and the detection strip 161 are provided to be aligned. Assume that the diffracted X-ray 141 diffracted at the diffraction angle 2θ passes through the slit 151 of the slit member 150 from the sample surface 131 located at the goniometer center G, and reaches the detector 160 located at the distance L from the slit 151. The goniometer angle at that time is $2Θ_0$, and the X-ray detection position D of the detector 160 is D=0. That is, when the goniometer angle is $2Θ_0$, the detection strip 161 (first detection strip) of the detector 160 at the X-ray detection position D=0 can detect the diffracted X-ray 141 diffracted at the diffraction angle 2θ.

Next, a case of X-ray detection position D≠0 will be described using FIGS. 7 and 8.

Figure 7:
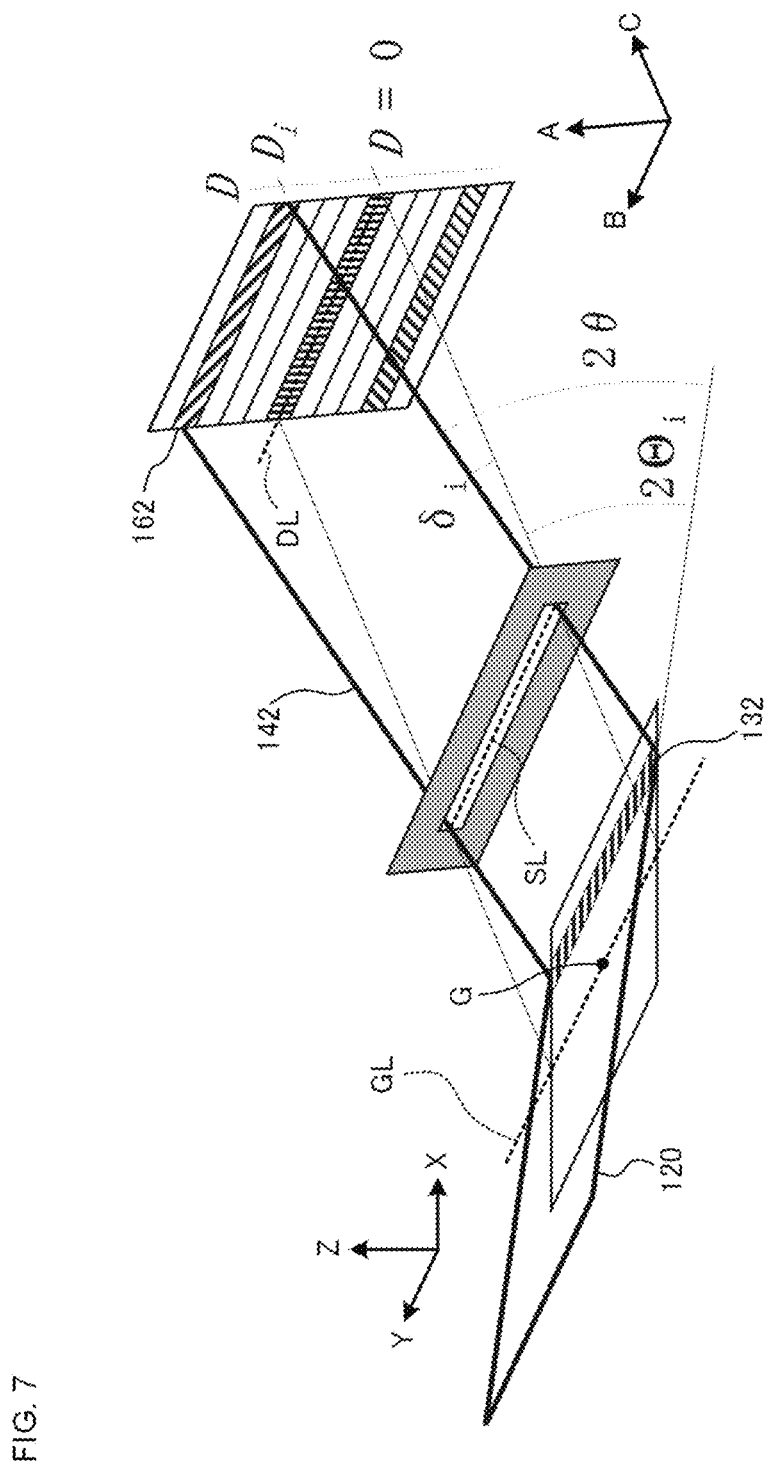
FIG. 7 is a perspective view illustrating an example of a relationship between the detector 160 and the X-ray detection position D when the goniometer angle 2Θ and the diffraction angle 2θ are mismatching.

FIG. 7 is a perspective view illustrating an example of a relationship between the detector 160 and the X-ray detection position D when the goniometer angle 2Θ and the diffraction angle 2θ are mismatching.

As shown in FIG. 7, when the goniometer angle 2Θ is smaller than the diffraction angle 2θ by a diffracted X-ray 142 diffracted at the diffraction angle 2θ passes through the slit 151 from the sample surface 132 and reaches the detection strip 162 (second detector strip) at the X-ray detection position $D=D_i$ of the detector 160. That is, the goniometer center G, the slit center line SL passing through the center of the slit 151 in the transverse direction (A-axis direction), and the detection strip 162 are provided to be aligned. Note that the X-ray detection position $D=D_i$ is a position that takes a positive value with the X-ray detection position D=0 as a reference.

Figure 8:
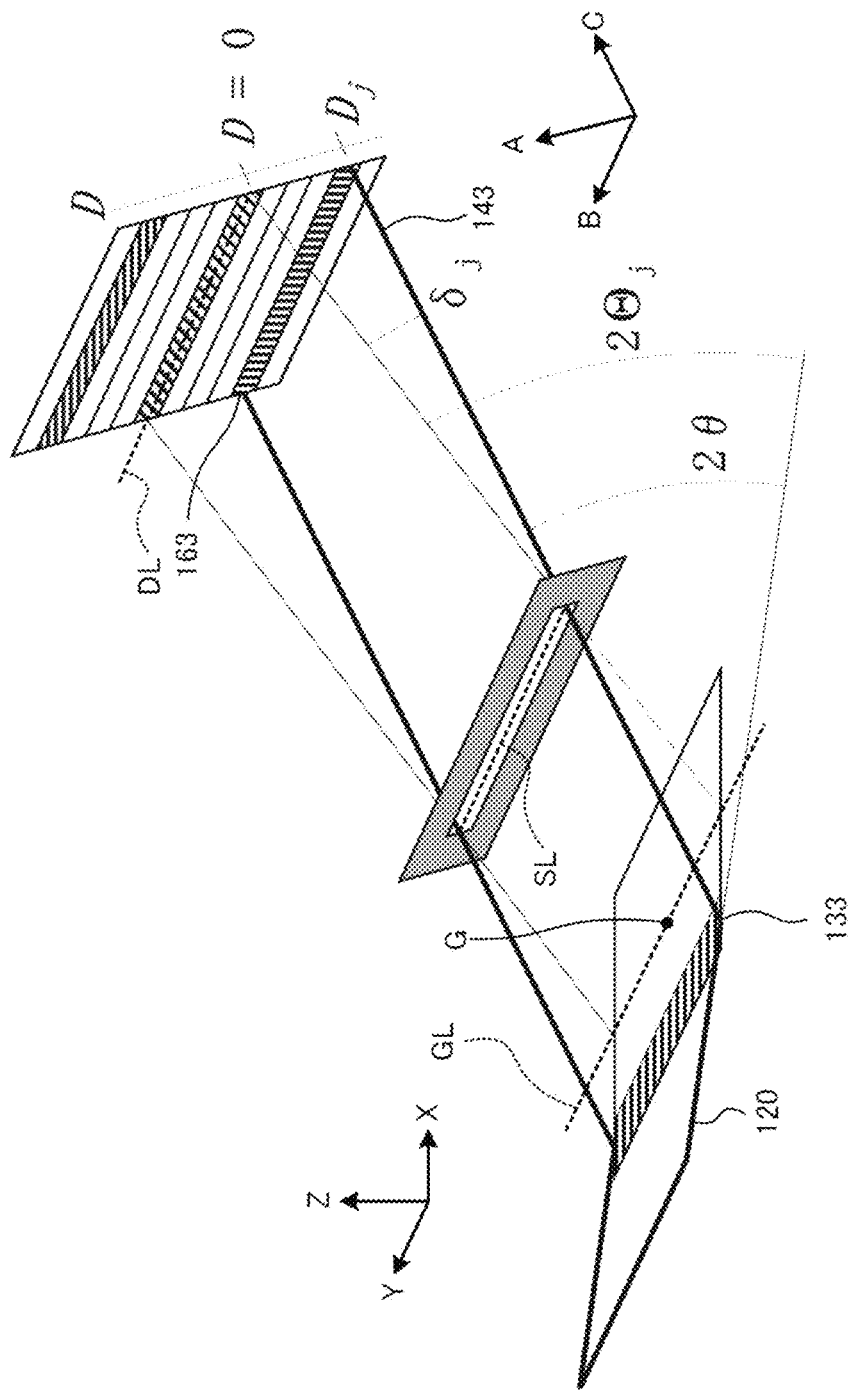
FIG. 8 is a perspective view illustrating an example of a relationship between the detector 160 and the X-ray detection position D when the goniometer angle 2Θ and the diffraction angle 2θ are mismatching.

Further, FIG. 8 is a perspective view illustrating an example of a relationship between the detector 160 and the X-ray detection position D when the goniometer angle 2Θ and the diffraction angle 2θ are mismatching.

As shown in FIG. 8, when the goniometer angle 2Θ is larger than the diffraction angle 2θ by δj, the diffracted X-ray 143 diffracted at the diffraction angle 2θ passes through the slit 151 from the sample surface 133 and reaches the detection strip 163 (second detection strip) at the X-ray detection position $D=D_j$ of the detector 160. That is, the goniometer center G, the slit center line SL passing through the center of the slit 151 in the transverse direction (A-axis direction), and the detection strip 163 are provided to be aligned. Note that the X-ray detection position $D=D_j$ is a position that takes a negative value with the X-ray detection position D=0 as a reference.

Between the goniometer angle 2Θ, the diffraction angle 2θ, the X-ray detection position D of the detector 160, and the shortest distance L from the front surface 150a of the slit member 150 to the detection surface 160a of the detector 160, a relational expression shown in Equation 3 is established. That is, the diffraction angle 2θ of the diffracted X-ray 141 depends on the shortest distance L from the front surface 150a of the slit member 150 to the detection surface 160a of the detector 160. According to another point of view, the distance L between the front surface 150a of the slit member 150 and the detection surface 160a of the detector 160 depends on the diffraction angle 2θ of the diffracted X-ray 142, the goniometer angle 2Θ, and a shortest distance from the detection strip 161 (first detection strip) to the detection strip 162 (second detection strip).

$$2\theta = 2\Theta + \tan^{-1}(D/L) \quad \text{[Equation 3]}$$

Figure 9:
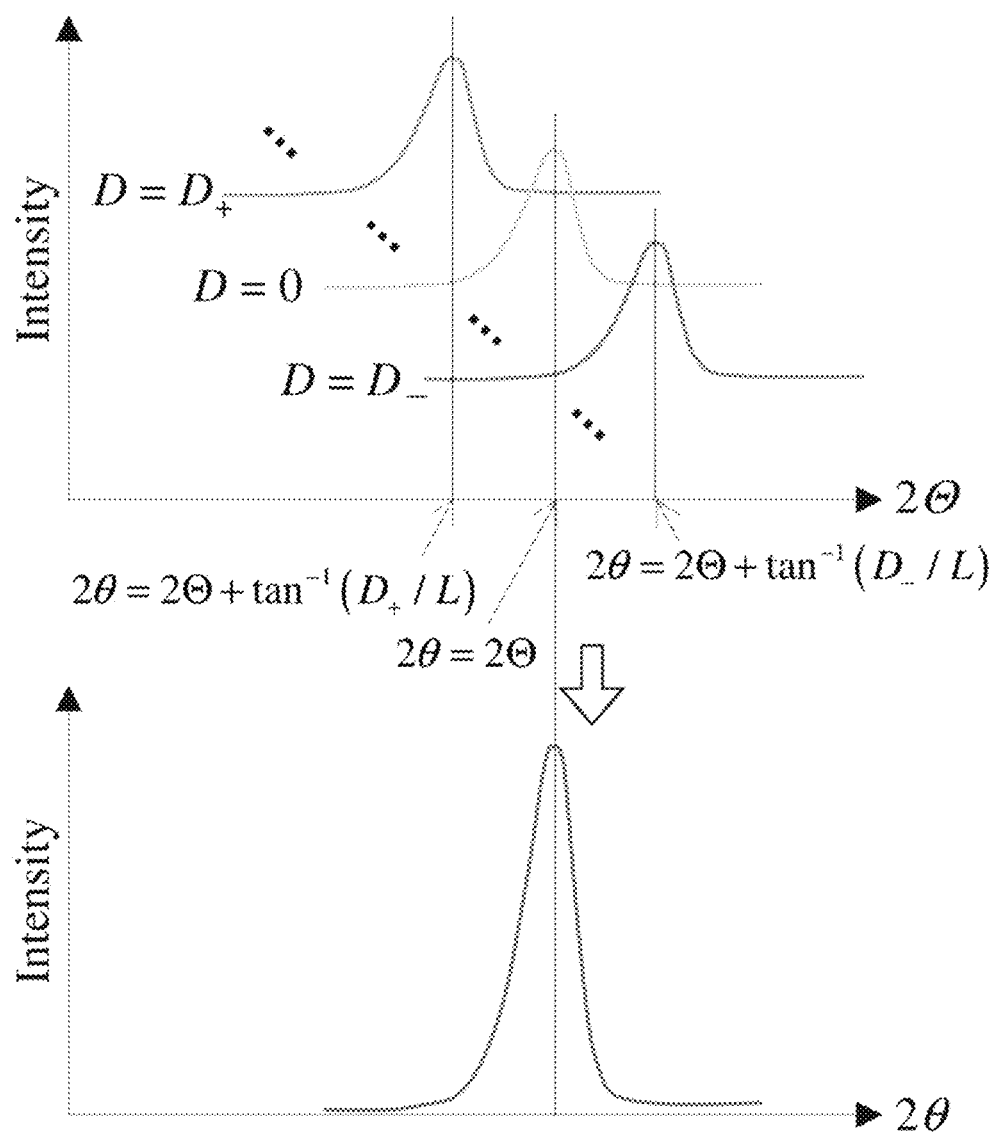
FIG. 9 is a diagram illustrating a profile obtained by an X-ray diffraction measurement.

FIG. 9 is a diagram illustrating a profile obtained by an X-ray diffraction measurement.

Intensities obtained from each of the detection strip 161, the detection strip 162, and the detection strip 163 are integrated to form a profile. Specifically, the diffraction angle 2θ is first calculated using the Equation 3. For instance, in FIG. 6, the diffraction angle 2θ is calculated using the shortest distance L from the front surface 150a of the slit member 150 to the detection surface 160a of the detector 160, the goniometer angle 2Θ, and the X-ray detection position D=0. Further, in FIG. 7, the diffraction angle 2θ is calculated using the distance L, a goniometer angle $2Θ_i$, and the X-ray detection position $D=D_i$. Furthermore, in FIG. 8, the diffraction angle 2θ is calculated using the distance L, a goniometer angle $2Θ_j$, and the X-ray detection position $D=D_j$. A profile can be obtained by integrating data of the same diffraction angle 2θ for intensity data obtained from each detection strip. Thereby, a profile can be obtained using the distance L as a parameter.

Next, an operation of the X-ray diffraction apparatus 100 described above will be illustrated.

The X-ray source 110 irradiates the sample F of the sample stage 130 with the incident X-ray 120 and allows the X-ray to diffract. The diffracted X-ray 140, which is the X-ray that has been diffracted, passes through the slit 151 of the slit member 150. The detector 160 detects the diffracted X-ray 140 in one dimension.

Figure 10:
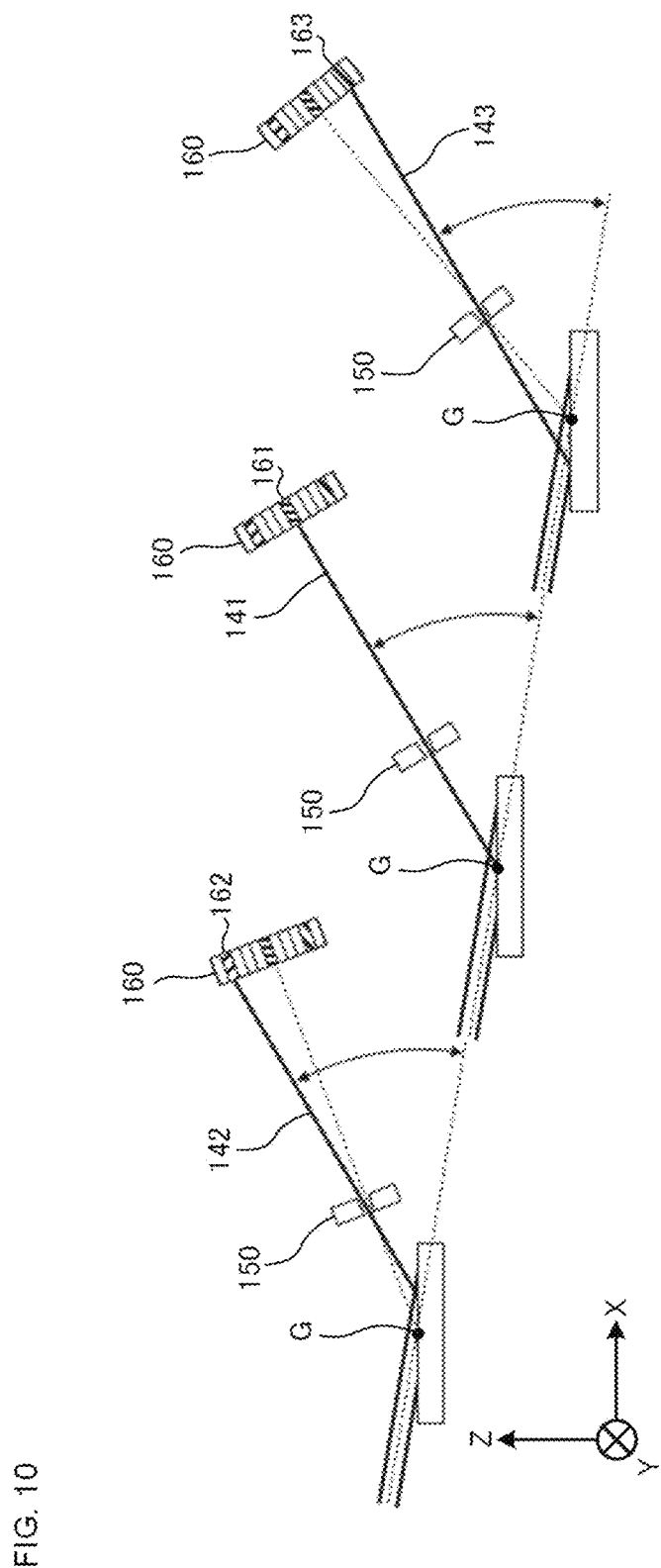
FIG. 10 is a diagram illustrating an operation of the X-ray diffraction apparatus 100 when acquiring data of the same diffraction angle 2θ.

FIG. 10 is a diagram illustrating an operation of the X-ray diffraction apparatus 100 when acquiring data of the same diffraction angle 2θ.

In FIG. 10, the slit member 150 and the detector 160 are in a circular motion with the goniometer center G as a reference. Specifically, while the shortest distance L from the slit 151 to the detection surface 160a and a axis in a longitudinal direction (B-axis direction) of the slit 151 remain parallel to an axis in a longitudinal direction (B-axis direction) of the detection strip 161, the goniometer angle 2Θ and the X-ray detection position D change. The detector 160 detects the diffracted X-ray 142 with the detection strip 161 (first detection strip) when the diffraction angle 2θ of the diffracted X-ray 141 is equal to the goniometer angle 2Θ. When the diffraction angle 2θ is not equal to the goniometer angle 2Θ, the detector 160 detects the diffracted X-ray 142 and the diffracted X-ray 143 with the detection strip 162 and the detection strip 163 (second detection strip) other than the detection strip 161 (first detection strip). In other words, even if data are measured at the same time (when the goniometer angle 2Θ is at a predetermined value), data of different diffraction angle 2θ can be measured by a position of the detection strip.

Figure 11:
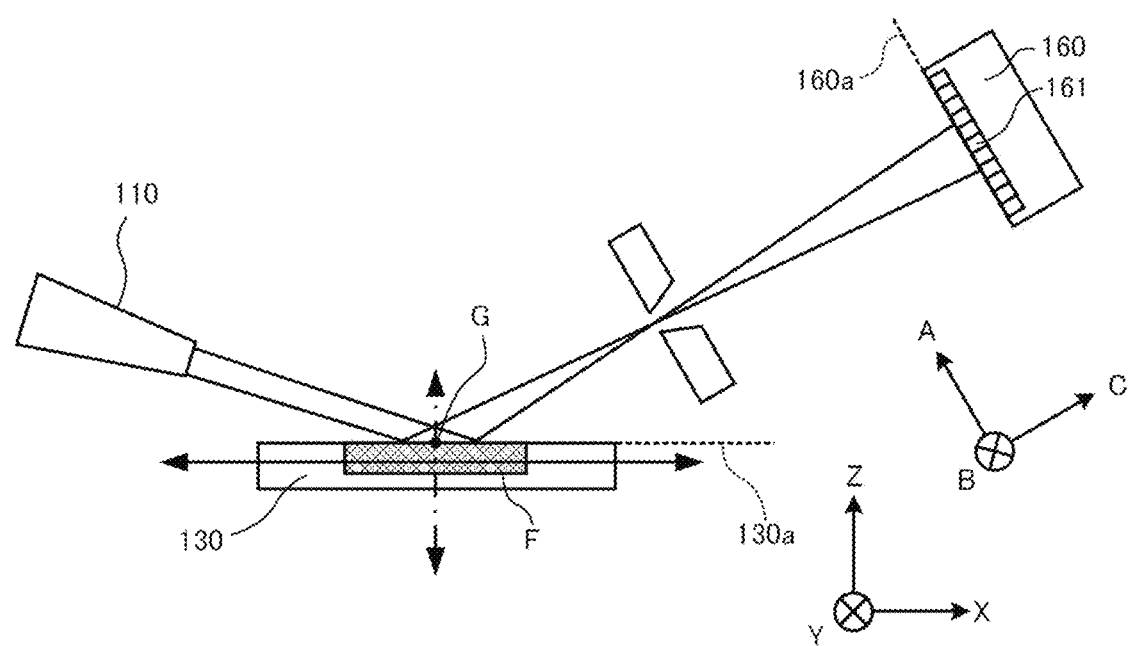
FIG. 11 is a side view showing an example of an operation of the X-ray diffraction apparatus 100 according to the first embodiment.

FIG. 11 is a side view showing an example of the operation of the X-ray diffraction apparatus 100 according to the first embodiment.

The sample stage 130 includes an installation surface 130a on which the sample F is disposed, and is configured to move parallel to the installation surface 130a. In other words, in FIG. 11, the sample stage 130 moves in X-axis direction (direction of a solid arrow) or Y-axis direction. Such movement in the X-axis direction or the Y-axis direction is effective in obtaining mom accurate diffraction intensity when grain size of sample is heterogeneous or the like. Further, the sample stage 130 may move perpendicularly with respect to the installation surface 130a. In other words, in FIG. 11, the sample stage 130 can move in Z-axis direction (direction of a dashed-dotted line arrow). Furthermore, only the sample stage 130 may be allowed to move in the X-axis direction, the Y-axis directions, or the Z-axis direction without moving an incident side of the X-ray source 110 or the like and a light receiving side of the detector 160 or the like.

Figure 12:
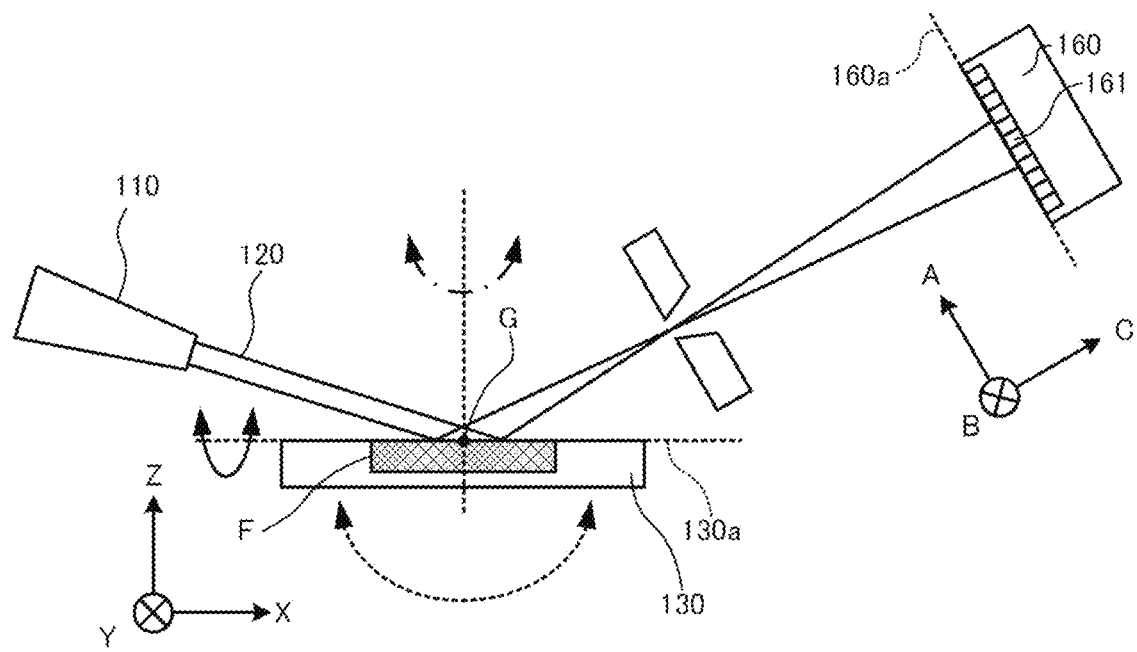
FIG. 12 is a side view showing an example of an operation of the X-ray diffraction apparatus 100 according to the first embodiment.

FIG. 12 is a side view showing an example of the operation of the X-ray diffraction apparatus 100 according to the first embodiment.

The sample stage 130 includes an installation surface 130a on which the sample F is disposed, and is configured to change an orientation of the installation surface 130a. The sample stage 130 is configured to rotate about an X-axis (direction of solid arrow) or a Y-axis (direction of dashed arrow) with the goniometer center G as a reference so as to change the orientation of the installation surface 130a. In this case, the sample stage 130 may only allow the sample F to rotate without moving the incident side of the X-ray source 110 or the like or the light receiving side of the detector 160 or the like. In particular, for a sample F such as an epitaxial thin film whose lattice plane normal faces a certain direction, when an angle between the lattice plane of the sample F and the incident X-ray 120 satisfies a diffraction condition due to the rotation of the sample F, diffracted X-ray that satisfy the diffraction condition can be detected by the detection strip of the detector 160. Moreover, the sample stage 130 may be configured to rotate about a Z-axis (direction of single-dotted line arrow) with the goniometer center G as a reference without changing the orientation of the installation surface 130a. Note that the direction of rotation about the X-axis is also referred to as a tilt direction.

First Comparative Example

Figure 13:
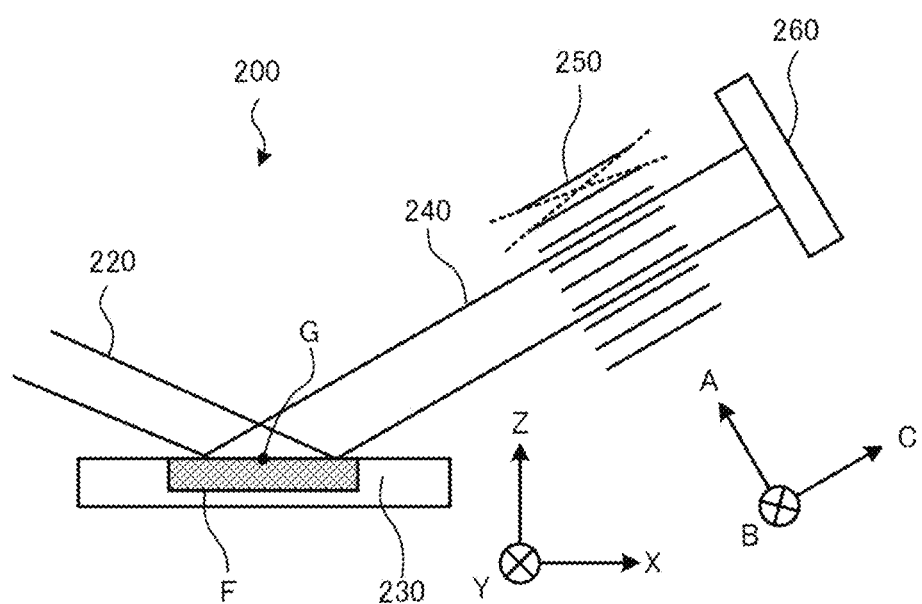
FIG. 13 is a side view showing an example of an X-ray diffraction apparatus 200 according to a first comparative example.

FIG. 13 is a side view showing an example of an X-ray diffraction apparatus 200 according to a first comparative example.

The X-ray diffraction apparatus 200 in the first comparative example comprises an X-ray source (not shown), a sample stage 230, a PSA 250, and a detector 260. For a basic configuration of the X-ray source, the sample stage 230, and the detector 260, please refer to the sample stage 130 and the detector 160 in the first embodiment. Note that relationship between the diffraction angle 2θ and the goniometer angle 2Θ is different between first embodiment and the first comparative example. Specifically, in the detector 160 of the first embodiment, a certain goniometer angle 2Θ is converted into the diffraction angle 2θ based on the distance L from the front surface 150a of the slit member 150 to the detection surface 160a of the detector 160. However, in the detector 260 of the first comparative example, a certain goniometer angle 2Θ is treated as equal to the diffraction angle 2θ.

The PSA 250 comprises a plurality of foils arranged in parallel. The detector 260 detects only a diffracted X-ray 240 that pass between the foils. This allows the detector 260 to acquire the same profile regardless of conditions such as position of the sample stage 230. Note that precision of the PSA 250 can be improved by narrowing a spacing between the foils and lengthening an optical path through the foils. However, when the spacing of the foil is shortened, diffracted X-ray may be scattered by the foil. The precision decreases due to detection of the scattered diffracted X-ray. In a measurement using the PSA 250, a profile is obtained with high accuracy but low intensity. Moreover, even if a beam width of the diffracted X-ray is widened, the obtained profile does not change, thus enabling highly accurate measurement.

Second Comparative Example

Figure 14:
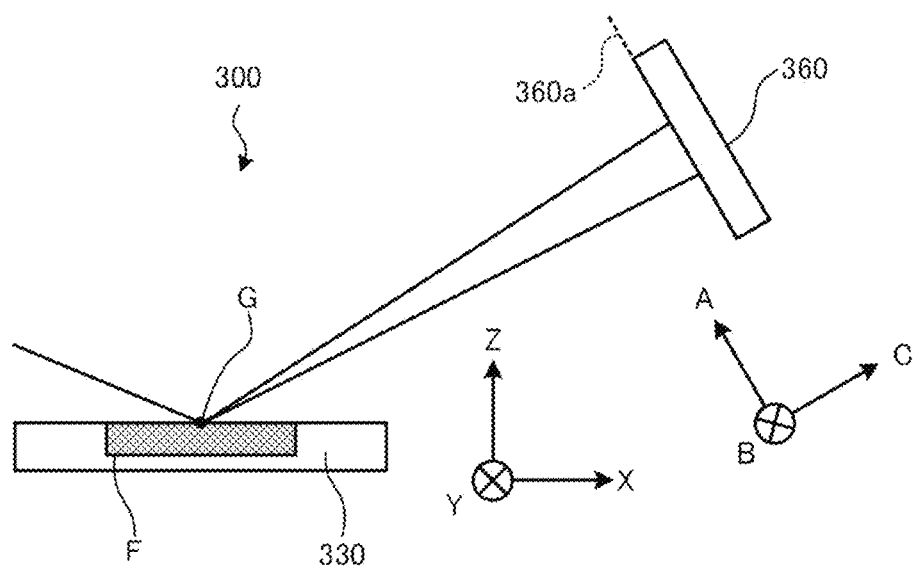
FIG. 14 is a side view showing an example of an X-ray diffraction apparatus 300 according to a second comparative example.

FIG. 14 is a side view showing an example of an X-ray diffraction apparatus 300 according to a second comparative example.

The X-ray diffraction apparatus 300 in the second comparative example comprises an X-ray source (not shown), a sample stage 330, and a detector 360. For the X-ray source, the sample stage 330, and the detector 360, please refer to the sample stage 130 and the detector 160 in the first embodiment.

Next, measurement results 1 to 5 will be described for the previously described first embodiment, the first comparative example, and the second comparative example.
[Condition of Measurement]

In the X-ray diffraction apparatus 100 of the first embodiment, the distance $L_S$ between the goniometer center G and the front surface 150a of the slit member 150 is 30 mm. The distance L between the front surface 150a of the slit member 150 and the detection surface 160a of the detector 160 is 270 mm. The slit width $W_S$ is 0.15 mm, and the strip width $W_D$ is 0.1 mm.

Further, in the X-ray diffraction apparatus 200 of the first comparative example, the PSA 250, the diagonal opening angle between the parallel foils of the PSA 250 (acute angle between the two dashed lines in FIG. 13) is 0.114°.

Furthermore, in the X-ray diffraction apparatus 300 of the second comparative example, the distance between the goniometer center G and the detection surface 360a of the detector 360 is 300 mm, and the strip width is 0.1 mm.

Next, a method for observing a profile obtained by an X-ray diffraction measurement will be described.

Figure 15:
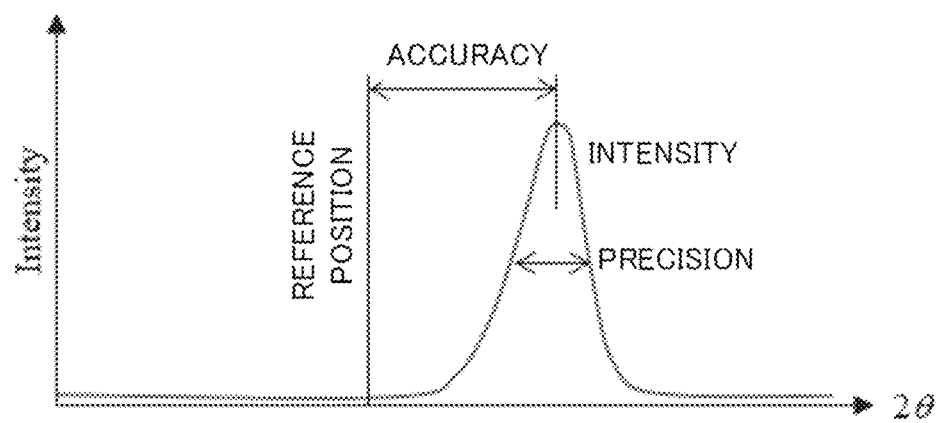
FIG. 15 is an example of a diagram illustrating accuracy and precision in an X-ray diffraction measurement.

FIG. 15 is an example of a diagram illustrating accuracy and precision in the X-ray diffraction measurement.

A peak is observed in a profile obtained by the X-ray diffraction measurement. By analyzing position and intensity of the peak, accuracy and precision of a sample can be determined. The accuracy is determined from the position of the peak. More specifically, the accuracy is determined by a size of discrepancy between a reference position, which is a position where the peak is originally obtained, and an actual measured peak position. In other words, if the position of the peak is close to the reference position, the accuracy can be determined as high. On the other hand, if the position of the peak is far from the reference position, the accuracy can be determined as low.

The precision is determined from a width of the peak (specifically, FWHM). More specifically, if the width of the peak is narrow, the precision can be determined as high. On the other hand, if the width of the peak is wide, the precision can be determined as low. Note that the precision may also be referred to as angular accuracy.

[Measurement Result 1: Comparison of Intensity]

Figure 16:
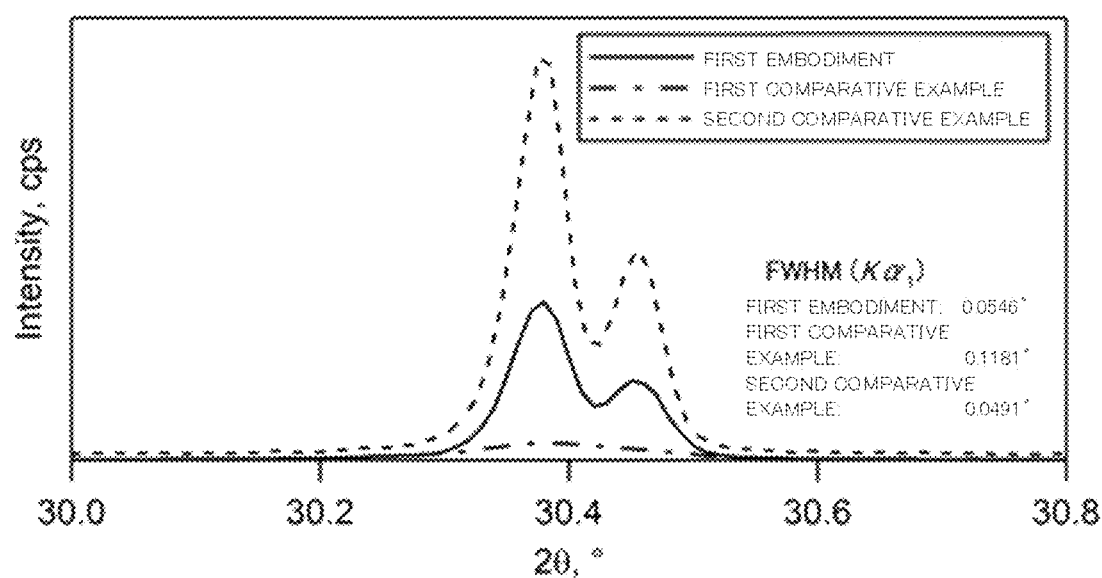
FIG. 16 is a diagram showing an example of a measurement result using the X-ray diffraction apparatus 100, the X-ray diffraction apparatus 200, the X-ray diffraction apparatus 300, respectively.

FIG. 16 is a diagram showing an example of a measurement result using the X-ray diffraction apparatus 100, the X-ray diffraction apparatus 200, the X-ray diffraction apparatus 300, respectively.

In FIG. 16, a solid line indicates a result of measurement with the slit member 150 of the first embodiment. Further, in FIG. 16, a single-dotted line indicates a result of the measurement with the first comparative example using the PSA 250. Furthermore, in FIG. 16, a dashed line indicates a result of measurement in the second comparative example which does not use slit and PSA. Compared to the X-ray diffraction apparatus 200 of the first comparative example using PSA, the X-ray diffraction apparatus 100 of the first embodiment has higher peak intensity and narrower peak width, thereby a measurement can be performed with high intensity and high precision.

[Measurement Result 2: Movement of Sample Toward Z-Axis Direction]

Next, a measurement result when a sample is allowed to move in a vertical direction (Z-axis direction) will be described with reference to FIGS. 17 to 19.

Figure 17:
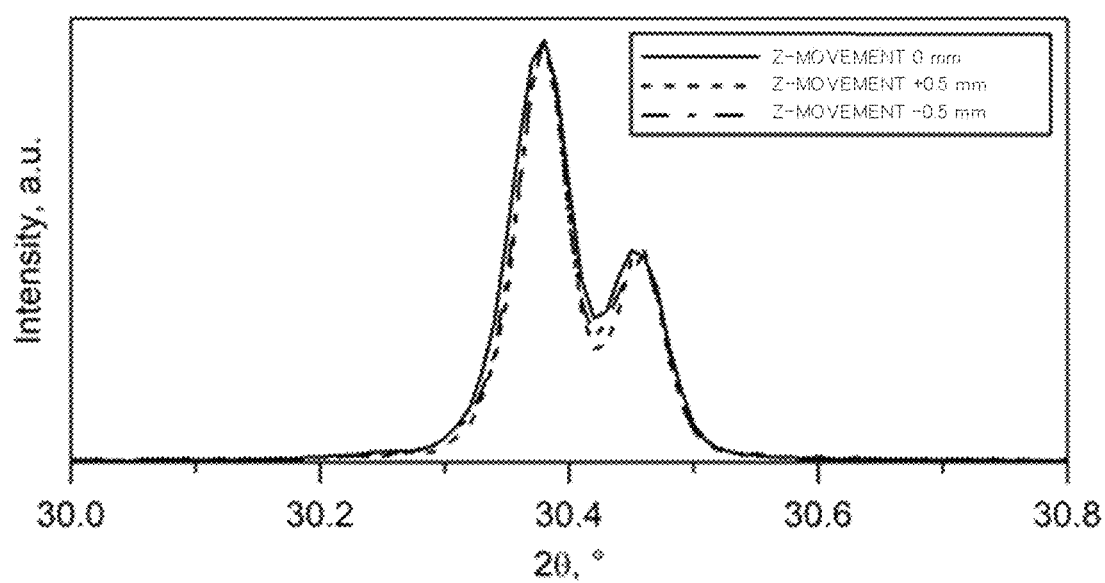
FIG. 17 is a diagram showing an example of a measurement result performed by allowing a sample F to move in a vertical direction using the X-ray diffraction apparatus 100 according to the first embodiment.

FIG. 17 is a diagram showing an example of a measurement result performed by allowing a sample F to move in a vertical direction using the X-ray diffraction apparatus 100 according to the first embodiment. Further, FIG. 18 is a diagram showing an example of a measurement result performed by allowing the sample F to move in the vertical direction using the X-ray diffraction apparatus 200 according to the first comparative example. Moreover, FIG. 19 is a diagram showing an example of a measurement result performed by allowing the sample F to move in the vertical direction using the X-ray diffraction apparatus 300 according to the second comparative example.

Figure 18:
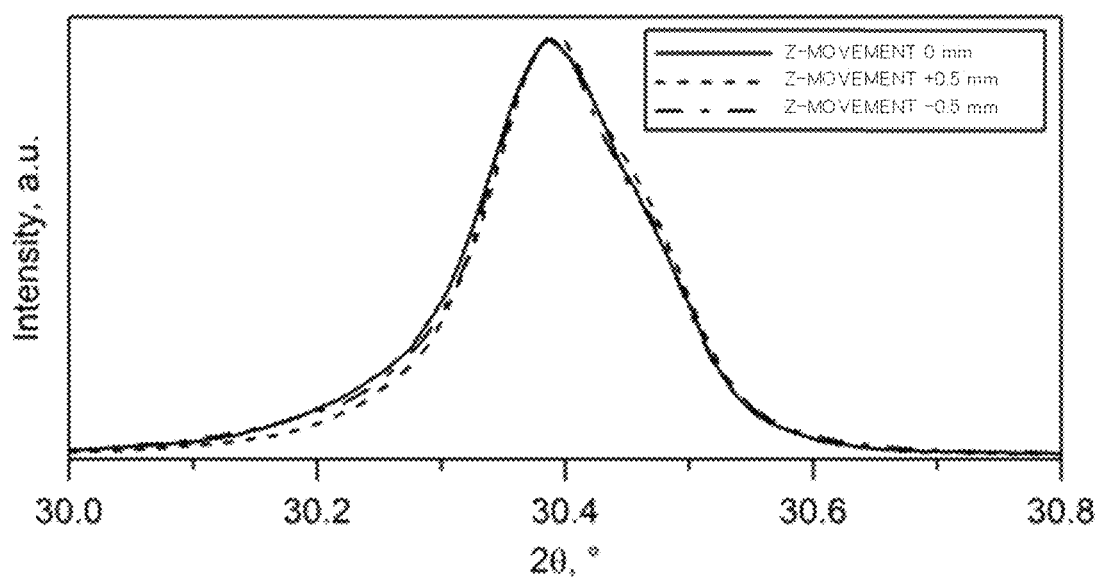
FIG. 18 is a diagram showing an example of a measurement result performed by allowing the sample F to move in the vertical direction using the X-ray diffraction apparatus 200 according to the first comparative example.
Figure 19:
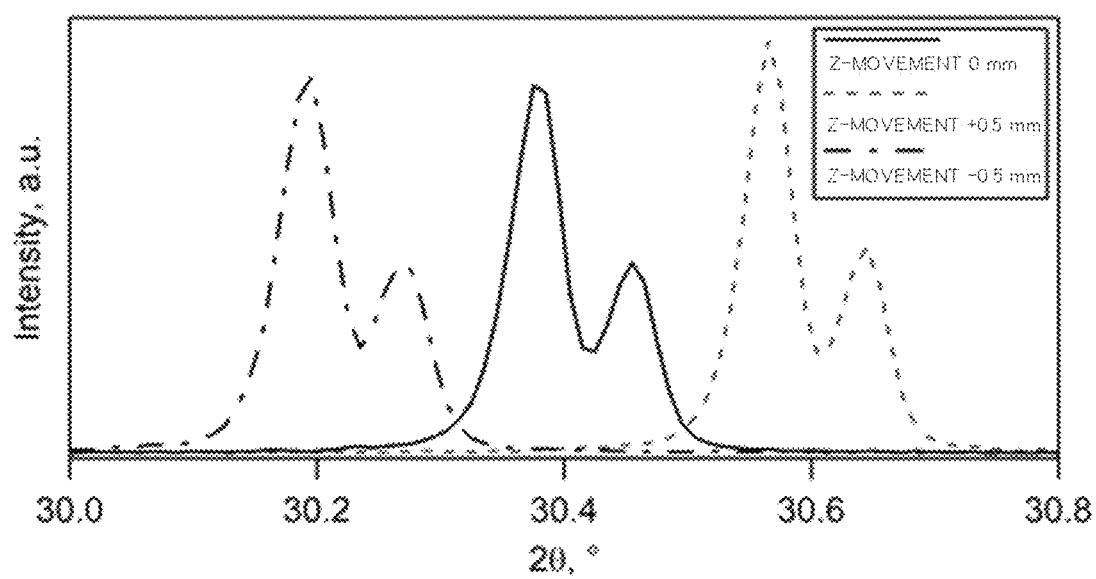
FIG. 19 is a diagram showing an example of a measurement result performed by allowing the sample F to move in the vertical direction using the X-ray diffraction apparatus 300 according to the second comparative example.

In FIGS. 17 through 19, a solid line indicates a case where the sample F is placed at the goniometer center G. In FIGS. 17 through 19, a dashed line indicates a case where the sample F is moved 0.5 mm upward from the goniometer center G. Moreover, In FIGS. 17 through 19, a single-dotted line indicates a case where the sample F is moved 0.5 mm downward from the goniometer center G.

As shown in FIG. 17, in the first embodiment using the slit member 150, even when the sample F moves, no shift of the peak position is observed, thus the accuracy is high. On the other hand, as shown in FIG. 18, in the first comparative example using the PSA 250, when the sample F moves, no shift in the peak position is observed, thus although the accuracy is high, a shape of the peak is more accurate than in FIG. 17. Further, as shown in FIG. 19, in the second comparative example in which slit and PSA are not used, when the sample F moves, a shift in the peak position is observed, resulting in a lack of accuracy.

In variable temperature measurement or the like, the sample position may change in a vertical direction depending on temperature, and the present embodiment is effective in such cases.

[Measurement Result 3: Change of Tilt Angle of Sample Surface]

Next, a result of measurement with the sample surface changed in a tilt direction (rotated around the X-axis) will be described with reference to FIGS. 20 to 22.

Figure 20:
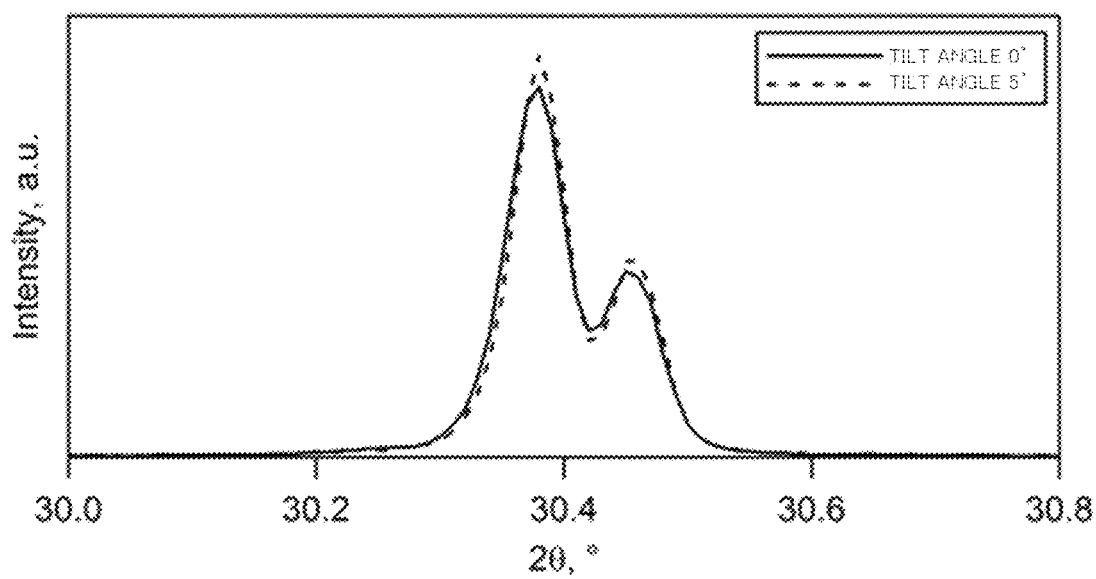
FIG. 20 is a diagram showing an example of a measurement result performed by allowing a sample surface to rotate in a tilt direction using the X-ray diffraction apparatus 100 according to the first embodiment.

FIG. 20 is a diagram showing an example of a measurement result performed by allowing a sample surface to rotate in an axial direction using the X-ray diffraction apparatus 100 according to the first embodiment. FIG. 21 is a diagram showing an example of a measurement result performed by allowing the sample surface to rotate in the axial direction using the X-ray diffraction apparatus 200 according to the first comparative example. Moreover, FIG. 22 is a diagram showing an example of a measurement result performed by allowing the sample surface to rotate in the axial direction using the X-ray diffraction apparatus 300 according to the second comparative example.

Figure 21:
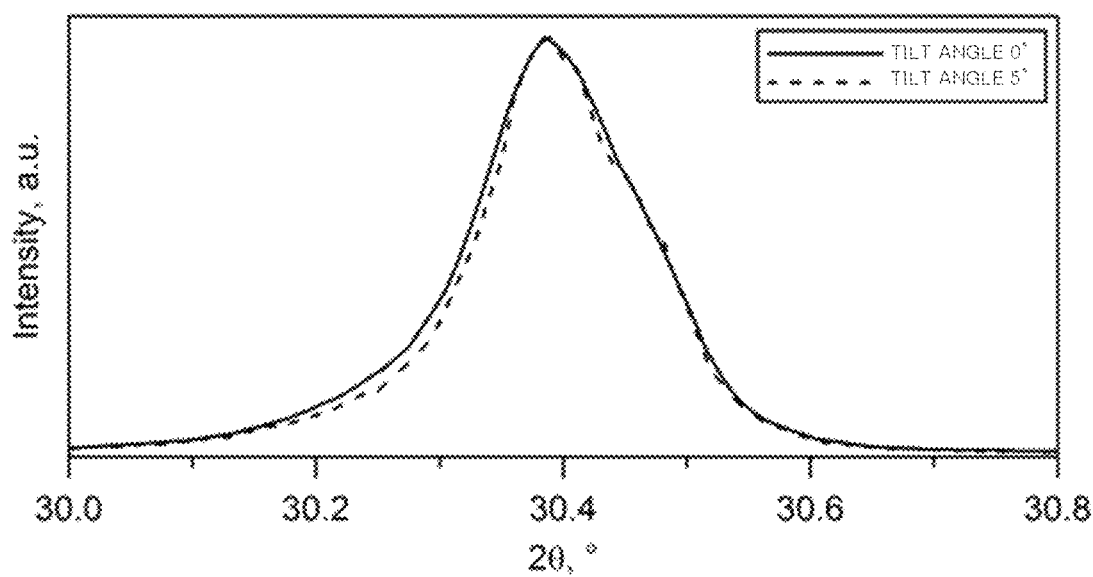
FIG. 21 is a diagram showing an example of a measurement result performed by allowing the sample surface to rotate in the tilt direction using the X-ray diffraction apparatus 200 according to the first comparative example.
Figure 22:
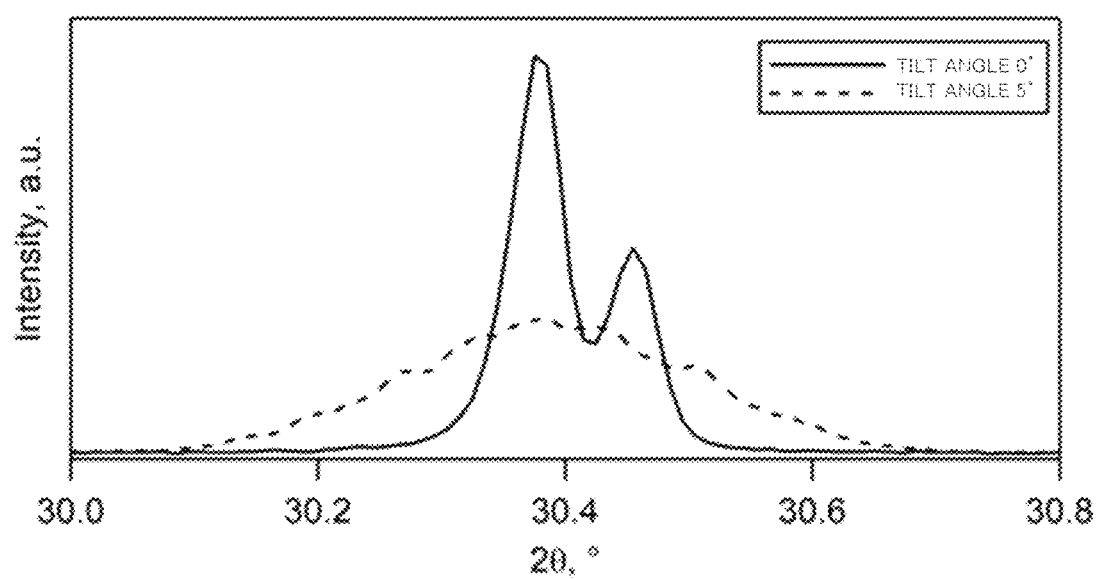
FIG. 22 is a diagram showing an example of a measurement result performed by allowing the sample surface to rotate in the tilt direction using the X-ray diffraction apparatus 300 according to the second comparative example.

In FIGS. 20 to 22, a solid line indicates a case where a tilt angle of the sample F is 0° with the goniometer center G as a reference. Further, in FIGS. 20 to 22, a dashed line indicates a case where a tilt angle of the sample F is 5° with the goniometer center G as a reference.

As shown in FIG. 20, in the first embodiment using the slit member 150, even when the sample surface is rotated in the tilt direction, an accurate peak shape is observed and no shift of the peak position is observed, thus precision and accuracy are high. On the other hand, as shown in FIG. 21, in the first comparative example using the PSA 250, when the sample surface is rotated in the tilt direction, although the accuracy is high since no shift of the peak position shift is observed, the precision is low because an accurate peak shape cannot be observed as compared with FIG. 20. Further, as shown in FIG. 22, in the second comparative example which does not use slit and PSA, when the sample surface is rotated in the tilt direction, although the accuracy is high since no shift of the peak position shift is observed, the precision is low because the width of the peak is widened.

If a sample with an uneven surface is measured, it will be affected in the same way as the present measurement result. Therefore, it is effective to use the slit member 150 even when measuring a sample with an uneven surface.

[Measurement Result 4: Change of Beam Width]

Next, a measurement result obtained by changing a beam width of an incident X-ray will be described with reference to FIGS. 23 to 25.

Figure 23:
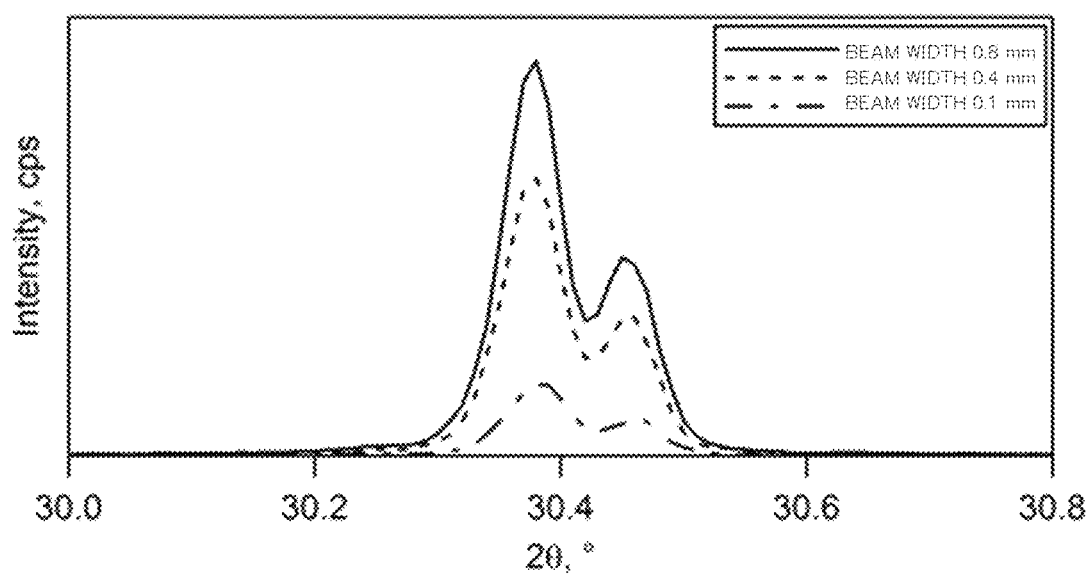
FIG. 23 is a diagram showing an example of a measurement result when allowing a beam width of an incident X-ray 120 to vary by using the X-ray diffraction apparatus 100 according to the first embodiment.

FIG. 23 is a diagram showing an example of a measurement result when allowing a beam width of an incident X-ray 120 to vary by using the X-ray diffraction apparatus 100 according to the first embodiment. FIG. 24 is a diagram showing an example of a measurement result when allowing the beam width of the incident X-ray 120 to vary by using the X-ray diffraction apparatus 200 according to the first comparative example. Further, FIG. 25 is a diagram showing an example of a measurement result when allowing the beam width of the incident X-ray 120 to vary by using the X-ray diffraction apparatus 300 according to the second comparative example.

Figure 24:
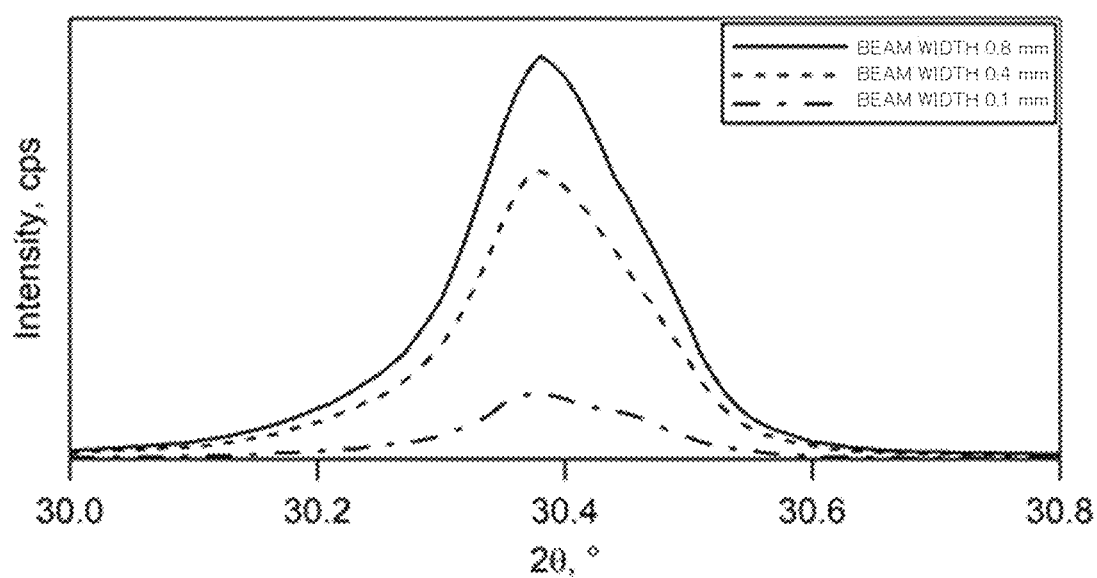
FIG. 24 is a diagram showing an example of a measurement result when allowing the beam width of the incident X-ray 120 to vary by using the X-ray diffraction apparatus 200 according to the first comparative example.
Figure 25:
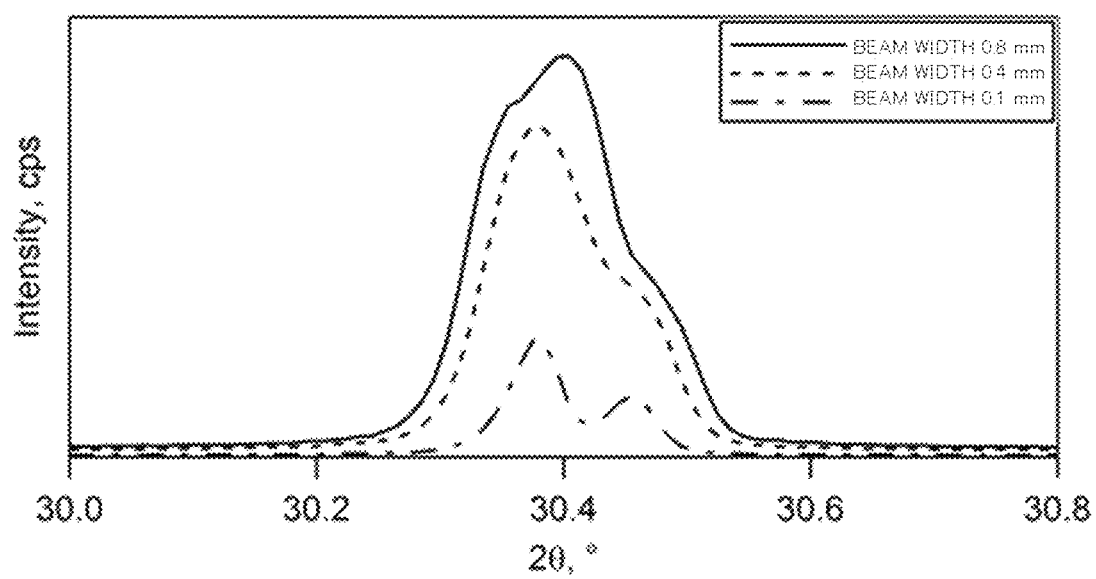
FIG. 25 is a diagram showing an example of a measurement result when allowing the beam width of the incident X-ray 120 to vary by using the X-ray diffraction apparatus 300 according to the second comparative example.

In FIGS. 23 to 25, a solid line indicates a case where an incident beam width is 0.8 mm. In FIGS. 23 to 25, a dashed line indicates a case where the incident beam width is 0.4 mm. Moreover, in FIGS. 23 to 25, a single-dotted line indicates a case where the incident beam width is 0.1 mm.

As shown FIG. 23, in the first embodiment using the slit member 150, even when the beam width of the incident X-ray is changed, no change in a shape of the peak is observed, and a measurement can be performed with high precision. On the other hand, as shown in FIG. 24, in the first comparative example using the PSA 250, although an accurate shape of the peak could not be observed compared to FIG. 23 when the beam width of the incident X-ray is changed, since no change in the shape of the peak is observed when the beam width of the incident X-ray is changed, effect on accuracy is small. Furthermore, as shown in FIG. 25, in the second comparative example which does not use slit and PSA, when the beam width of the incident X-ray is changed, the peak of the diffraction angle remains the same, the width of the peak increases as the incident beam width increases, thus the precision decreases.

[Measurement Result 5: Change of Incident Angle of Incident X-Ray]

Next, a measurement result obtained by changing an incident angle of an incident X-ray to a sample will be described.

Figure 26:
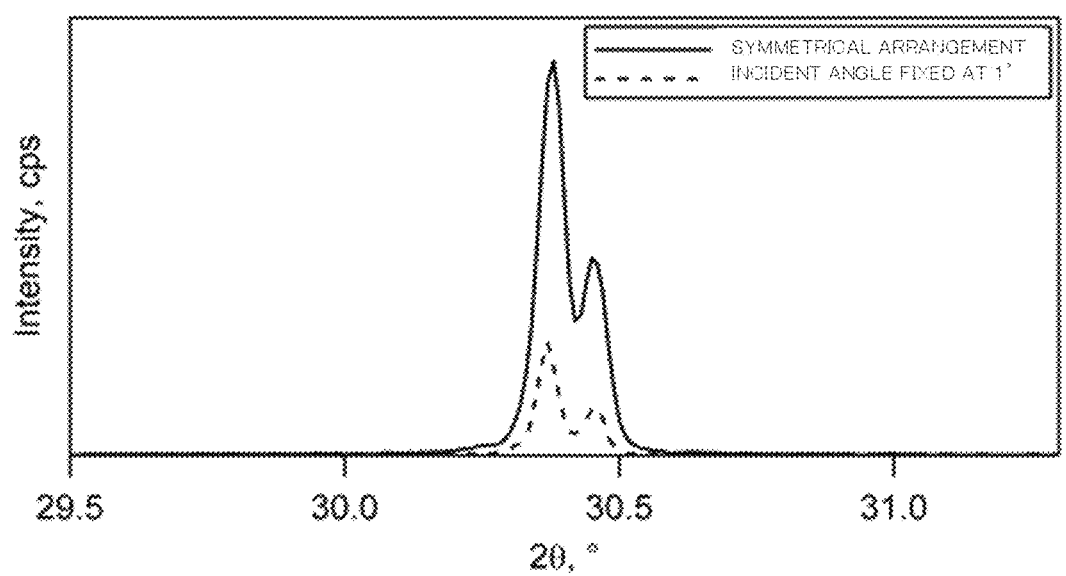
FIG. 26 is a diagram showing an example of a measurement result performed by changing an incident angle of the incident X-ray 120 using the X-ray diffraction apparatus 100 according to the first embodiment.
Figure 27:
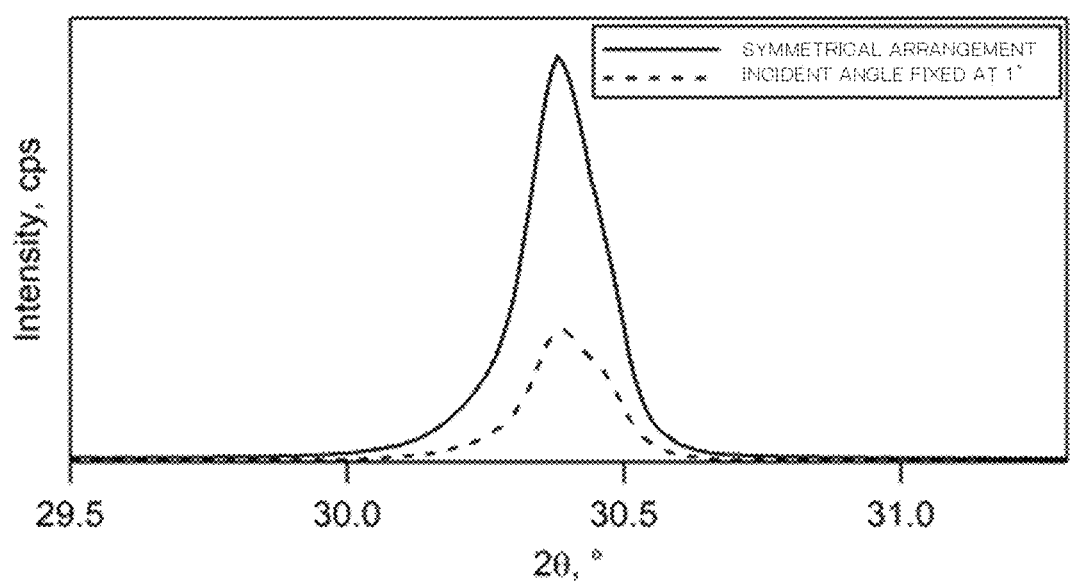
FIG. 27 is a diagram showing an example of a measurement result performed by changing an incident angle of an incident X-ray 220 using the X-ray diffraction apparatus 200 according to the first comparative example.

FIG. 26 is a diagram showing an example of a measurement result performed by changing an incident angle of the incident X-ray 120 using the X-ray diffraction apparatus 100 according to the first embodiment. FIG. 27 is a diagram showing an example of a measurement result performed by changing an incident angle of an incident X-ray 220 using the X-ray diffraction apparatus 200 according to the first comparative example. Moreover, FIG. 28 is a diagram showing an example of a measurement result performed by changing an incident angle of an incident X-ray using the X-ray diffraction apparatus 300 according to the second embodiment.

Figure 28:
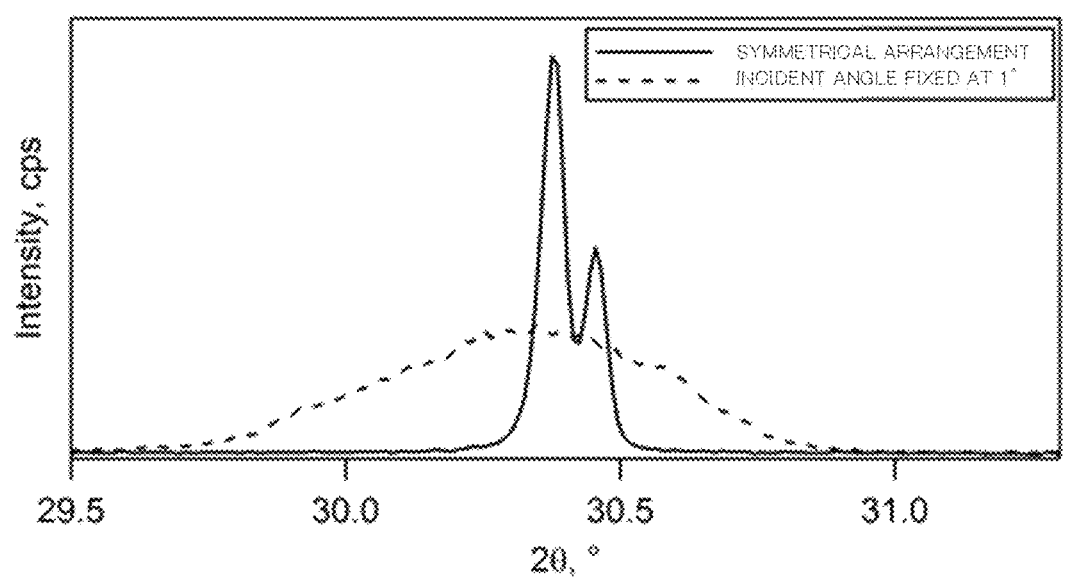
FIG. 28 is a diagram showing an example of a measurement result performed by changing an incident angle of an incident X-ray using the X-ray diffraction apparatus 300 according to the second embodiment.

In FIGS. 26 to 28, a solid line indicates a result of measurement with a symmetrical arrangement (incident angle and emission angle are the same). Further, in FIGS. 26 to 28, a dashed line indicates a case where the incident angle is fixed at 1.0° and a measurement is performed while moving only a light receiving side.

As shown FIG. 26, in the first embodiment using the slit member 150, even when the incident angle of the incident X-ray is changed, no change in a shape of the peak is observed, and a measurement can be performed with high precision. On the other hand, as shown in FIG. 27, in the first comparative example using the PSA, although no change of precision is observed when the incident angle of the incident X-ray is changed, compared with FIG. 26, an accurate shape of the peak could not be observed, indicating that the accuracy is low. Furthermore, as shown in FIG. 28, in the second comparative example which does not use slit and PSA, when the incident angle of the incident X-ray is changed, the peak of the diffraction angle remains the same, the width of the peak increases, thus the precision decreases.

When the incident angle is shallower than the emission angle, the beam width of the diffracted X-ray is widened, resulting in the same state as when the beam width of the incident X-ray of a measurement result 4 is widened. In an in-plane measurement or a measurement of thin film material, a measurement may be performed by fixing a small incident angle with respect to the sample surface, and the present embodiment is effective in such cases.

Based on the above measurement results, the first embodiment using the slit member 150 provides higher precision and higher intensity result compared to the first comparative example using the PSA 250. In addition, influence on the precision and accuracy caused by changes in the sample position, the tilt angle of the sample surface, the beam width of the incident X-ray, or the incident angle of the incident X-ray observed in the second comparative example, which does not use slit and PSA, is not observed in the first embodiment.

[First Modification]

Figure 29:
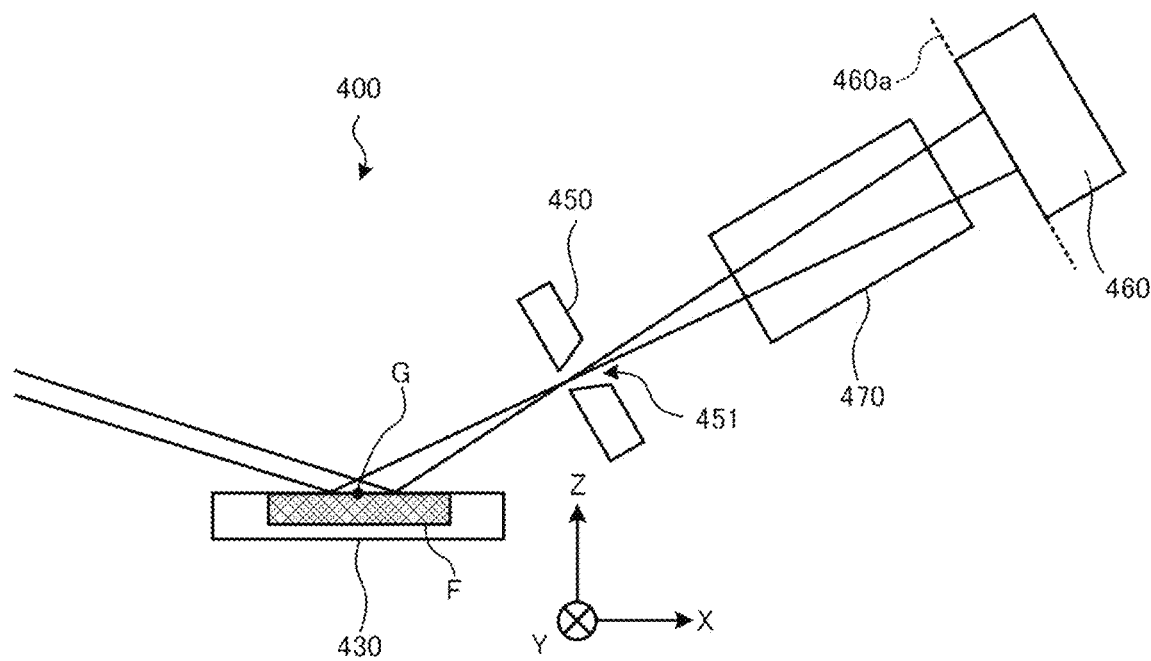
FIG. 29 is a side view showing an example of an X-ray diffraction apparatus 400 according to a first modification of the first embodiment.
Figure 30:
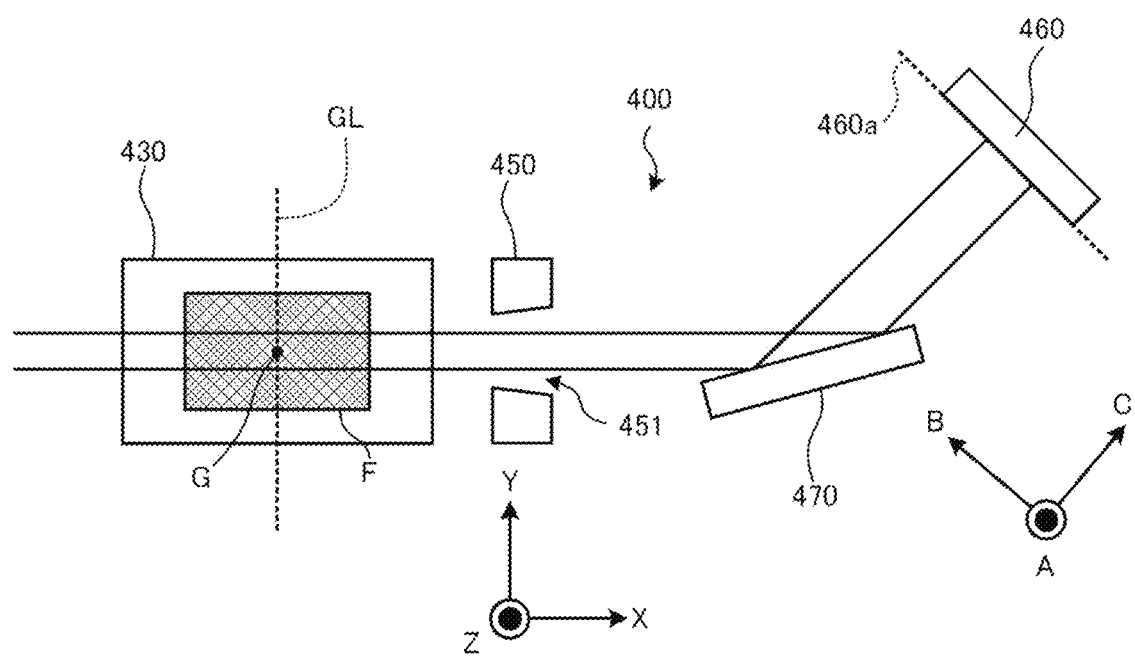
FIG. 30 is a top view showing an example of the X-ray diffraction apparatus 400 according to the first modification of the first embodiment.

FIG. 29 is a side view showing an example of an X-ray diffraction apparatus 400 according to a first modification of the first embodiment. Further, FIG. 30 is a top view showing an example of the X-ray diffraction apparatus 400 according to the first modification of the first embodiment.

The X-ray diffraction apparatus 400 of the first modification comprises an X-ray source (not shown), a sample stage 430, a slit member 450, a detector 460, and a monochromator 470. For the X-ray source, the sample stage 430, and the slit member 450, please refer to the sample stage 130 and the slit member 150 in the first embodiment.

The monochromator 470 comprising a lattice plane diffracting the diffracted X-ray of a specific wavelength. In addition, the monochromator 470 is provided between the slit member 450 and the detector 460 in such a manner that the lattice plane is inclined in a direction from one longitudinal (B-axis direction) end of the slit 451 toward to another end. Furthermore, the monochromator 470 is provided in an orientation perpendicular to the diffraction angle. The monochromator 470 monochromatizes the diffracted X-ray. Moreover, the monochromator 470 is mainly, but not exclusively, made of graphite in X-ray diffraction measurement using a powder sample.

The detector 460 is provided to detect diffracted X-ray of the specific wavelength diffracted by the monochromator 470. That is, the detector 460 is provided downstream from the monochromator 470 with a detection surface 460a pointing toward the monochromator 470. The detector 460 is shifted in Y-axis direction from the monochromator 470.

Next, a case where incident X-rays are non-parallel will be described with reference to FIGS. 31 and 32.

Especially, except when the incident X-rays are focused at the sample, when a traveling direction of the incident X-ray and shape of the sample are known, non-parallel incident X-ray 520 and non-parallel incident X-ray 620 can be applied.

[Second Modification]

Figure 31:
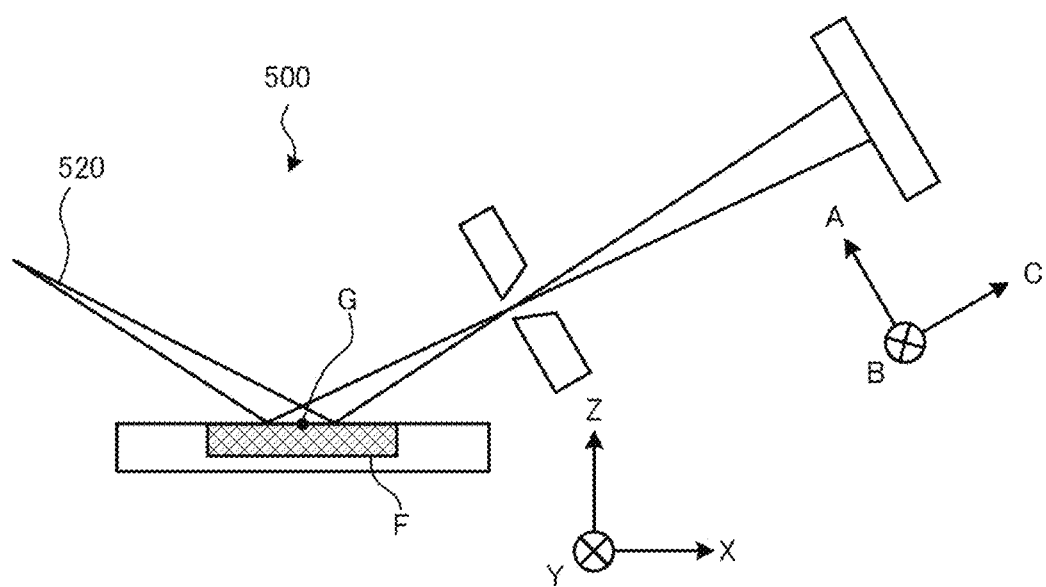
FIG. 31 is a side view showing an example of an X-ray diffraction apparatus 500 according to a second modification of the first embodiment.

FIG. 31 is a side view showing an example of an X-ray diffraction apparatus 500 according to a second modification of the first embodiment.

In the X-ray diffraction apparatus 500 of the second modification, an X-ray source (not shown) irradiates toward the sample F with an incident X-ray 520 to diverge in a traveling direction.

[Third Modification]

Figure 32:
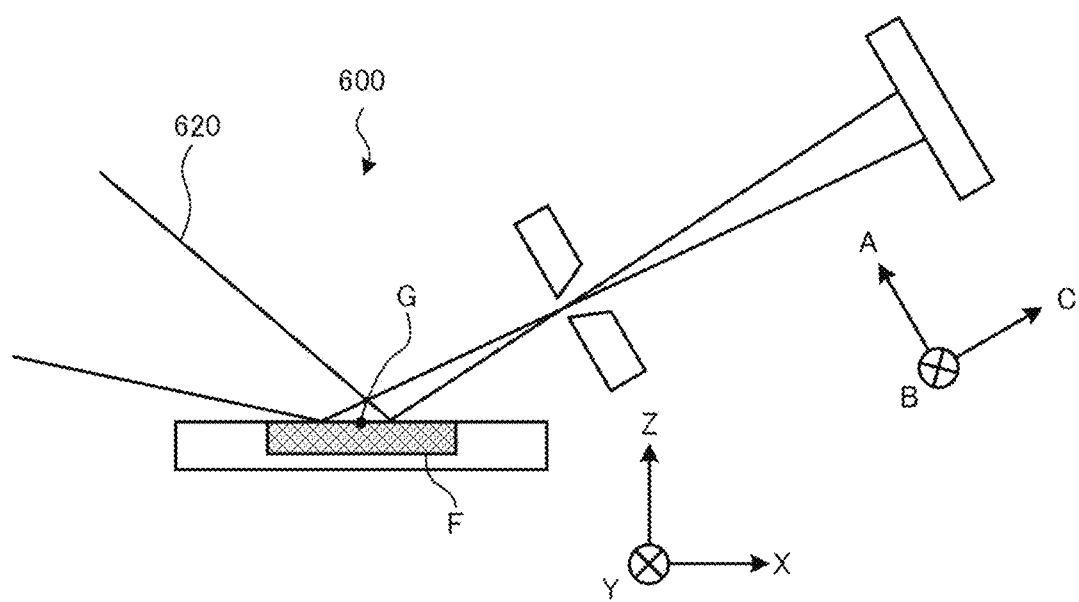
FIG. 32 is a side view showing an example of an X-ray diffraction apparatus 600 according to a third modification of the first embodiment.

FIG. 32 is a side view showing an example of an X-ray diffraction apparatus 600 according to a third modification of the first embodiment.

In the X-ray diffraction apparatus 600 of the third modification, an X-ray source (not shown) irradiates toward the sample F with an incident X-ray 620 so as to converge toward a traveling direction.

[Fourth Modification]

Figure 33:
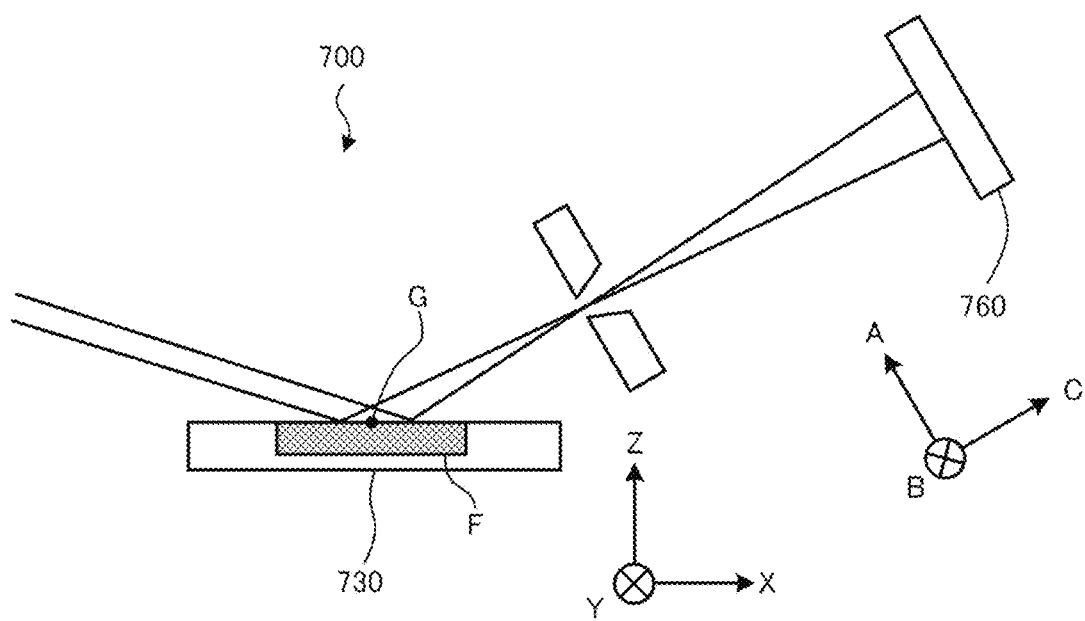
FIG. 33 is a side view showing an example of an X-ray diffraction apparatus 700 according to a fourth modification of the first embodiment.

FIG. 33 is a side view showing an example of an X-ray diffraction apparatus 700 according to a fourth modification of the first embodiment.

In the X-ray diffraction apparatus 700 of the fourth modification, a profile can be obtained while keeping an incident side such as an X-ray source (not shown), a light receiving side such as a detector 760, and a position of a sample F such as a sample stage 730 constant.

In particular, it can be used when measuring changes over time in a measurement using a powder sample F, when measuring changes in peaks at short time intervals such as during temperature control measurement, or when simply measuring a narrow range (a single peak), etc.

[Fifth Modification]

Figure 34:
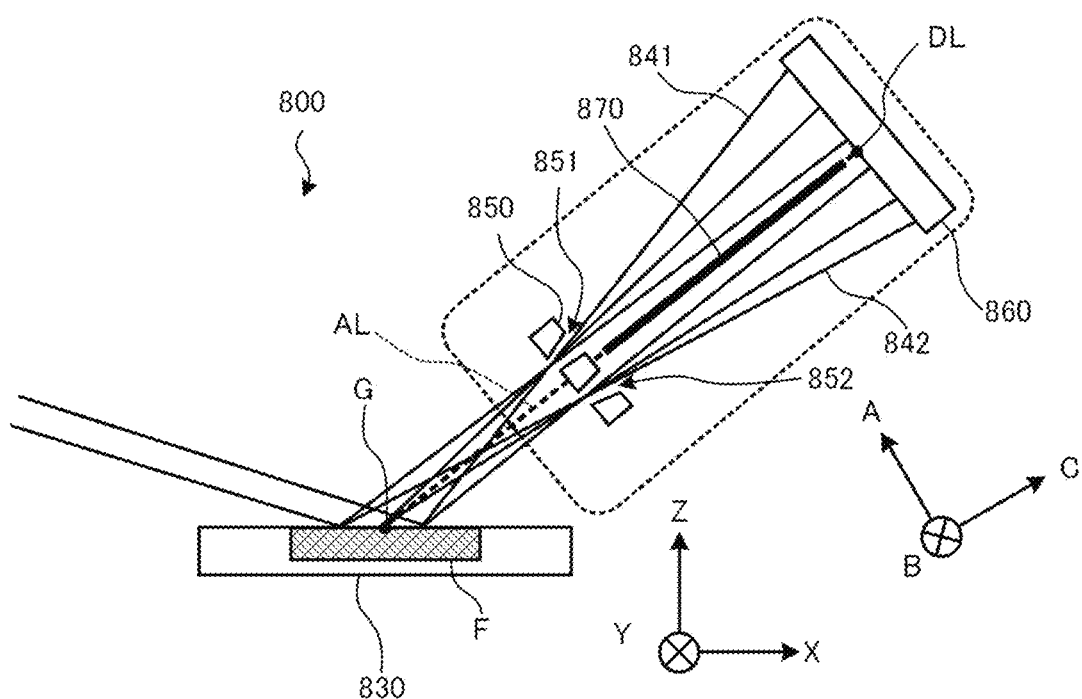
FIG. 34 is a side view showing an example of an X-ray diffraction apparatus 800 according to a fifth modification of the first embodiment.

FIG. 34 is a side view showing an example of an X-ray diffraction apparatus 800 according to a fifth modification of the first embodiment.

The X-ray diffraction apparatus 800 of the fifth modification comprises an X-ray source (not shown), a sample stage 830, a slit member 850, a detector 860, and an interference prevention member 870. For the sample stage 830 and the detector 860, please refer to the sample stage 130 and the detector 160 in the first embodiment.

The slit member 850 includes a first slit 851 and a second slit 852. A longitudinal (B-axis direction) axis of the first slit 851 and a longitudinal (B-axis direction) axis of the second slit 852 are parallel.

The interference prevention member 870 is configured to prevent interference, between the slit member 850 and the detector 860, between a first diffracted X-ray 841 passing through the first slit 851 and a second diffracted X-ray 842 passing through the second slit 852. That is, the interference prevention member 870 extends from the slit member 850 toward the detector 860. In other words, the interference prevention member 870 extends in a C-axis direction. The interference prevention member 870 may be made of stainless steel or the like as long as it does not transmit X-ray. Furthermore, a shape of the interference prevention member 870 is not limited to a plate shape, as long as it is capable of shielding X-ray in such a manner that diffracted X-rays passing through different slits do not interfere with each other. In addition, the interference prevention member 870 is supported on the slit member 850, the detector 860, or an arm of the goniometer.

In the fifth modification, although the number of the slit 851 and the slit 852 is two, an arbitrary number can be selected to expand a detection region in the detector 860. Meanwhile, although the number of the interference prevention member 870 is one, an arbitrary number can be selected to prevent diffracted X-ray passing through different slits from interfering with each other.

Figure 35:
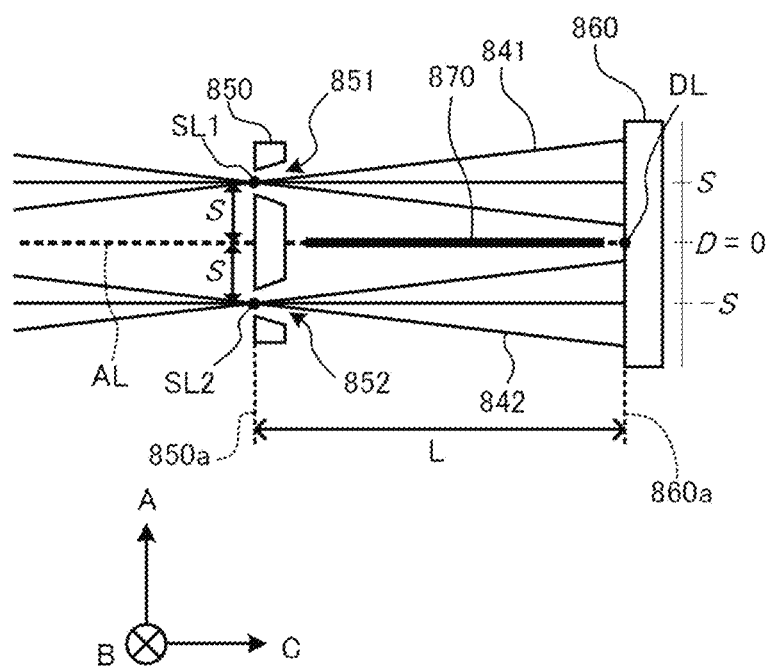
FIG. 35 is an enlarged view enlarging a region surrounded by a dashed line in FIG. 34.

Next, with referring to FIG. 35, a method of conversion to a diffraction angle 2θ when using the X-ray diffraction apparatus 800 of the fifth modification will be described. Even in the fifth modification, the diffraction angle 2θ of the diffracted X-ray 841 and the diffracted X-ray 842 depends on a shortest distance L from a front surface 850a of the slit member 850 to a detection surface 860a of the detector 860. FIG. 35 is an enlarged view enlarging a region surrounded by a dashed line in FIG. 34. A goniometer angle line AL is a straight line connecting a goniometer center G and a detector center line DL at the shortest distance. Moreover, a slit center line SL1 and a slit center line SL2 are straight lines that pass through centers of the slit 851 and the slit 852 in transverse direction (A-axis direction) and extend in a B-axis direction. In the fifth modification, an angle between the goniometer angle line AL and the shortest line connecting the goniometer center G and the slit center line SL1 of the first slit 851 (and the slit center line SL2 of the second slit 852) needs to be taken into account to convert the angle into a diffraction angle 2θ and integrate the profile.

Here, an X-ray detection position D=0 is a position where the goniometer angle line AL and the detector 860 intersect and is equal to a position of the detector center line DL. A distance S is a shortest distance from the slit center line SL1 of the first slit 851 (or the slit center line SL2 of the second slit 852) to the goniometer angle line AL. Moreover, the distance L is a distance from the front surface 850a of the slit member 850 to the detection surface 860a of the detector 860. As described above, a diffraction angle 2θ of the first diffracted X-ray 841 detected at a position of the X-ray detection position D=D1 through the first slit 851 is presented by Equation 4. Further, a diffraction angle 2θ of the second diffracted X-ray 842 detected at a position of the X-ray detection position D=D2 through the second slit 852 is presented by Equation 5.

$$2\theta = 2\Theta + \tan^{-1}((D1-S)/L) \quad \text{[Equation 4]}$$

$$2\theta = 2\Theta + \tan^{-1}((D2+S)/L) \quad \text{[Equation 5]}$$

Second Embodiment

The technique disclosed in the present application can also be used for an in-plane measurement.

The in-plane measurement allows direct measurement of diffraction from a lattice plane perpendicular to a sample surface, thus allows direct evaluation on a structure near the surface, thereby enables an accurate evaluation on a sample.

FIG. 36 is a perspective view showing an example of an X-ray diffraction apparatus 900 according to a second embodiment.

The X-ray diffraction apparatus 900 of the second embodiment comprises an X-ray source (not shown), a sample stage 930, a slit member 950, and a detector 960. That is, the X-ray source irradiates an incident X-ray 920 at a small incident angle to a sample surface that is monochromatic and parallel to the sample surface. The incident X-ray 920 is diffracted by a lattice plane perpendicular to the sample surface and become a diffracted X-ray 940 to travel in a direction that is grazing the sample surface. The diffracted X-ray 940 is received by the detector 960 via the slit member 950. The detector 960 outputs an electrical signal corresponding to intensity of the received X-ray.

In addition, in the second embodiment, to detect the diffracted X-ray 940, the slit member 950 and the detector 960 are arranged in such a manner that a longitudinal direction of a slit 951 and a longitudinal direction of a detection strip 961 are parallel to each other. Furthermore, in addition to the X-ray diffraction apparatus 900 that performs in-plane measurement, an in-plane reciprocal lattice mapping apparatus or a GI-WAXS (Grazing-Incidence Wide-Angle X-ray Scattering)/GI-SAXS (Grazing-incidence Small-Angle X-ray Scattering) apparatus can also be applied.

[Other]

The technique disclosed in the present application can also be used for measurements using pinhole and two-dimensional detector.

Figure 37:
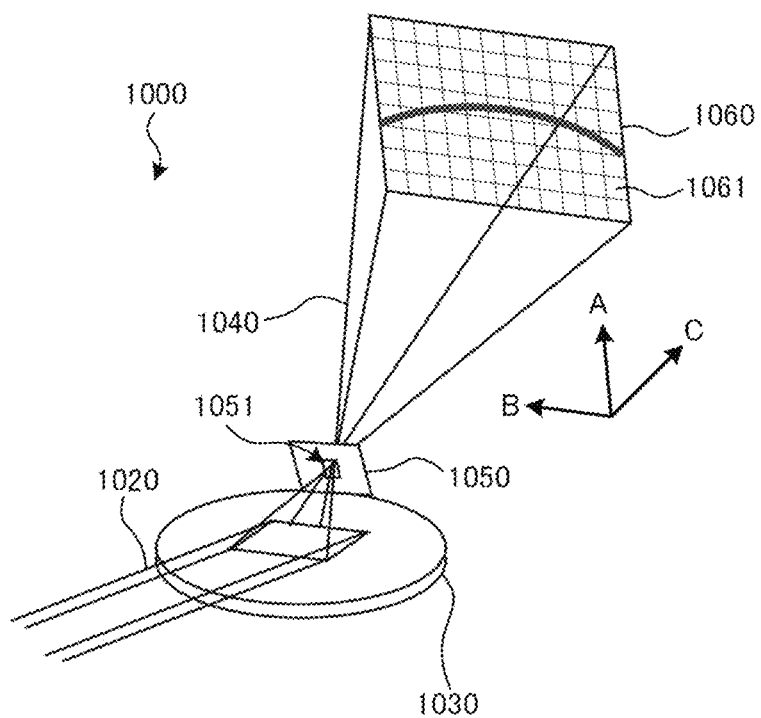
FIG. 37 is a perspective view showing an example of an X-ray diffraction apparatus 1000 using a pinhole member 1050 and a two-dimensional detector 1060.

FIG. 37 is a perspective view showing an example of an X-ray diffraction apparatus 1000 using a pinhole member 1050 and a two-dimensional detector 1060.

In the first embodiment and the second embodiment, although a case of using a slit and a one-dimensional detector is described, a Debye ring can also be detected instead of a pinhole and a two-dimensional detector, respectively.

The X-ray diffraction apparatus 1000 in the present embodiment comprises an X-ray source (not shown), a sample stage 1030, a pinhole member 1050, and a two-dimensional detector 1060.

The X-ray source irradiates an incident X-ray 1020 parallel to the sample stage 1030. In a center of the pinhole member 1050, a pinhole 1051 is formed to allow a diffracted X-ray to pass through. Here, among X-rays diffracted at a crystal lattice plane that exists in a direction perpendicular to a sample surface, only a diffracted X-ray 1040 that pass through the pinhole 1051 directs to the two-dimensional detector 1060. In addition, the two-dimensional detector 1060 is not a detection strip that extends in a width direction like a one-dimensional detector, but rather detects the diffracted X-ray 1040 by a pixel 1061. Furthermore, in another embodiment, a plurality of slit members may be provided between the sample stage 1030 and the two-dimensional detector 1060 in such a manner that longitudinal directions of the slits are different from each other, so as to replace the pinhole member 1050. For instance, a first slit member with a longitudinal direction of a slit extending in an A-axis direction and a second slit member with a longitudinal direction of a slit extending in a B-axis direction may be provided between the sample stage 1030 and the two-dimensional detector 1060.

The technology disclosed in the present application relates to an X-ray diffraction apparatus and a measurement method using a slit (or pinhole) and a one-dimensional (or two-dimensional) detector, where precision and accuracy of a peak are independent of sample position and sample shape. In addition, it is possible to obtain data with higher intensity and higher precision compared to a measurement using PSA. Furthermore, intensity and precision can be selected by changing position of the slit, width of the slit, and arrangement of the slit and detector.

The present invention may be provided in each of the following aspects.

The X-ray diffraction apparatus, wherein: the slit comprises a tapered shape that spreads from the sample stage toward the detector.

The X-ray diffraction apparatus, wherein: a width in a transverse direction of the slit is wider than a width in a transverse direction of the detection strip.

The X-ray diffraction apparatus, wherein: a center of a goniometer circle, a center in a transverse direction of the slit and the detection strip are provided to be aligned.

The X-ray diffraction apparatus, wherein: a diffraction angle of the diffracted X-ray depends on a distance from the slit to the detector.

The X-ray diffraction apparatus, wherein: a distance between the slit and the detector depends on a diffraction angle of the diffracted X-ray, an angle of a goniometer and a distance from one detection strip to another detection strip.

The X-ray diffraction apparatus, wherein: the detector is configured to detect the diffracted X-ray with a first detection strip when a diffraction angle of the diffracted X-ray is equal to a goniometer angle, and to detect the diffracted X-ray with a second detection strip when the diffraction angle is not equal to the goniometer angle.

The X-ray diffraction apparatus, further comprising an interference prevention member, wherein the slit member comprises a first slit and a second slit, an axis in a longitudinal direction of the fast slit and an axis in a longitudinal direction of the second slit are parallel to each other, and the interference prevention member is configured to prevent interference, between the slit member and the detector, between a first diffracted X-ray passing through the first slit and a second diffracted X-ray passing through the second slit.

The X-ray diffraction apparatus, further comprising: a monochromator comprising a lattice plane diffracting the diffracted X-ray of a specific wavelength, provided between the slit member and the detector in such a manner that the lattice plane is inclined in a direction from one longitudinal end of the slit toward to another end.

The X-ray diffraction apparatus, wherein: the sample stage comprises an installation surface on which the sample is disposed, and is configured to move parallel to the installation surface.

The X-ray diffraction apparatus, wherein: the sample stage comprises an installation surface on which the sample is disposed, and is configured to rotate about an axis so as to change an orientation of the installation surface.

The X-ray diffraction apparatus, wherein: the X-ray irradiated from the X-ray source to the sample is a parallel X-ray.

A measurement method of a sample, comprising: irradiating the sample with an X-ray, and allowing the X-ray to diffract; allowing a diffracted X-ray, which is the X-ray that has been diffracted, to pass through a slit; and measuring the sample by detecting the diffracted X-ray in one dimension with a detection strip; wherein an axis in a longitudinal direction of the slit is parallel to an axis in a longitudinal direction of the detection strip.

Of course, the above aspects are not limited thereto.

Finally, various embodiments of the present invention have been described, but these are presented as examples and are not intended to limit the scope of the invention. The novel embodiment can be implemented in various other forms, and various omissions, replacements, and changes can be made without departing from the abstract of the invention. The embodiment and its modifications are included in the scope and abstract of the invention and are included in the scope of the invention described in the claims and the equivalent scope thereof.

What is claimed is:

1. An X-ray diffraction apparatus, comprising:
   an X-ray source configured to irradiate a sample with an X-ray;
   a sample stage configured to allow the sample to be disposed in such a manner that the X-ray is diffracted;
   a detector configured to detect a diffracted X-ray, which is the X-ray that has been diffracted, in one dimension at a detection strip; and
   a slit member
      provided between the sample stage and the detector, comprising a slit through which the diffracted X-ray can pass,
   wherein an axis in a longitudinal direction of the slit is parallel to an axis in a longitudinal direction of the detection strip, and
   wherein a diffraction angle of the diffracted X-ray depends on a distance from the slit to the detector.

2. The X-ray diffraction apparatus according to claim 1, wherein:

the slit comprises a tapered shape that spreads from the sample stage toward the detector.

3. The X-ray diffraction apparatus according to claim 1, wherein:
a width in a transverse direction of the slit is wider than a width in a transverse direction of the detection strip.

4. The X-ray diffraction apparatus according to claim 1, wherein;
a center of a goniometer circle, a center in a transverse direction of the slit and the detection strip are provided to be aligned.

5. The X-ray diffraction apparatus according to claim 4, wherein:
a distance between the slit and the detector depends on a diffraction angle of the diffracted X-ray, an angle of a goniometer and a distance from one detection strip to another detection strip.

6. The X-ray diffraction apparatus according to claim 4, wherein:
the detector is configured to detect the diffracted X-ray with a first detection strip when a diffraction angle of the diffracted X-ray is equal to a goniometer angle, and to detect the diffracted X-ray with a second detection strip when the diffraction angle is not equal to the goniometer angle.

7. The X-ray diffraction apparatus according to claim 1, further comprising an X-ray shielding portion extending from the slit member toward the detector and configured to shield X-rays that diffracted X-rays passing through different slits do not interfere with each other, wherein:
the slit member comprises a first slit and a second slit,
an axis in a longitudinal direction of the first slit and an axis in a longitudinal direction of the second slit are parallel to each other, and
the X-ray shielding portion is configured to prevent interference, between the slit member and the detector, between a first diffracted X-ray passing through the first slit and a second diffracted X-ray passing through the second slit.

8. The X-ray diffraction apparatus according to claim 1, further comprising:
a monochromator
comprising a lattice plane diffracting the diffracted X-ray of a specific wavelength,
provided between the slit member and the detector in such a manner that the lattice plane is inclined in a direction from one longitudinal end of the slit toward to another end.

9. The X-ray diffraction apparatus according to claim 1, wherein:
the sample stage comprises an installation surface on which the sample is disposed, and is configured to move parallel to the installation surface.

10. The X-ray diffraction apparatus according to claim 1, wherein:
the sample stage comprises an installation surface on which the sample is disposed, and is configured to rotate about an axis so as to change an orientation of the installation surface.

11. The X-ray diffraction apparatus according to claim 1, wherein:
the X-ray irradiated from the X-ray source to the sample is a parallel X-ray.

12. A measurement method of a sample, comprising:
irradiating the sample with an X-ray, and allowing the X-ray to diffract;
allowing a diffracted X-ray, which is the X-ray that has been diffracted, to pass through a slit; and
measuring the sample by detecting the diffracted X-ray in one dimension with a detection strip; wherein
an axis in a longitudinal direction of the slit is parallel to an axis in a longitudinal direction of the detection strip, and
wherein a diffraction angle of the diffracted X-ray depends on a distance from the slit to the detector.

* * * * *